United States Patent
Damji et al.

(10) Patent No.: US 9,591,574 B2
(45) Date of Patent: Mar. 7, 2017

(54) DYNAMIC RECEIVE DIVERSITY SELECTION FOR LTE

(71) Applicant: Apple Inc., Cupertino, CA (US)

(72) Inventors: Navid Damji, Cupertino, CA (US);
Johnson O. Sebeni, Fremont, CA (US);
Tarik Tabet, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 357 days.

(21) Appl. No.: 14/050,256

(22) Filed: Oct. 9, 2013

(65) Prior Publication Data

US 2014/0098694 A1 Apr. 10, 2014

Related U.S. Application Data

(60) Provisional application No. 61/711,717, filed on Oct. 9, 2012.

(51) Int. Cl.
*H04W 52/02* (2009.01)
*H04B 7/08* (2006.01)
*H04W 76/04* (2009.01)

(52) U.S. Cl.
CPC ....... *H04W 52/0229* (2013.01); *H04B 7/0877* (2013.01); *H04W 76/046* (2013.01)

(58) Field of Classification Search
CPC ........... H04W 72/042; H04W 52/0225; H04W 52/0229; H04W 52/0212; H04W 76/048; H04W 76/046; H04L 5/0053; H04B 7/0877; H04B 7/08
USPC ........ 370/328, 329, 252, 310, 334, 311, 352
See application file for complete search history.

(56) References Cited

U.S. PATENT DOCUMENTS

| | | | |
|---|---|---|---|
| 2009/0017766 A1* | 1/2009 | Patel ................. | H04B 7/0874 455/67.11 |
| 2012/0219040 A1* | 8/2012 | Valentine et al. ........... | 375/219 |
| 2012/0250541 A1* | 10/2012 | Ko .................. | H04L 1/0026 370/252 |
| 2012/0257523 A1* | 10/2012 | Kasturi .............. | H04B 7/0871 370/252 |
| 2012/0287815 A1* | 11/2012 | Attar ................. | H04B 7/0871 370/253 |
| 2013/0044723 A1* | 2/2013 | Li ..................... | H04L 1/0026 370/329 |
| 2013/0170416 A1* | 7/2013 | Gopalan ............. | H04B 7/0877 370/311 |

(Continued)

Primary Examiner — Habte Mered
Assistant Examiner — Rownak Islam
(74) *Attorney, Agent, or Firm* — Downey Brand LLP

(57) ABSTRACT

Methods, apparatuses and computer readable media are described that configure wireless circuitry in a wireless communication device. The wireless communication device establishes a connection to a wireless network using wireless circuitry that includes a first radio frequency receive signal chain and a second radio frequency receive signal chain. The wireless communication device monitors uplink and downlink traffic activity communicated between the wireless communication device and the wireless network and measures downlink radio frequency receive signal conditions at the wireless communication device. The wireless communication device reconfigures the wireless circuitry to enable receive diversity or to disable receive diversity at the wireless communication device based on the monitored traffic activity and the measured downlink radio frequency receive signal conditions.

20 Claims, 11 Drawing Sheets

(56) References Cited

U.S. PATENT DOCUMENTS

| | | | |
|---|---|---|---|
| 2013/0201834 A1* | 8/2013 | Klingenbrunn | H04W 28/12 370/236 |
| 2013/0242772 A1* | 9/2013 | Attar | H04B 7/0871 370/252 |
| 2014/0161024 A1* | 6/2014 | Speight | H04W 74/0833 370/315 |
| 2014/0335876 A1* | 11/2014 | Ratasuk | H04W 16/14 455/450 |

* cited by examiner

DYNAMIC RECEIVE DIVERSITY SELECTION FOR LTE

CROSS-REFERENCE TO RELATED APPLICATIONS

This application claims the benefit of U.S. Provisional Application No. 61/711,717, filed Oct. 9, 2012 and entitled "DYNAMIC RECEIVER DIVERSITY SELECTION FOR LTE," which is incorporated by reference herein in its entirety for all purposes.

TECHNICAL FIELD

The described embodiments generally relate to methods and apparatuses for managing connections between wireless communication devices and wireless networks. More particularly, the present embodiments describe configuring wireless circuitry in a wireless communication device to receive signals from a Long Term Evolution (LTE) wireless network through different numbers of radio frequency (RF) receive signal chains based on traffic activity and on receive RF signal conditions measured at the wireless communication device.

BACKGROUND

Wireless networks continue to evolve as new communication technologies develop and standardize. Wireless network operators can deploy new communication technologies in parallel with earlier generation communication technologies, and wireless networks can support multiple communication technologies simultaneously to provide smooth transitions through multiple generations of wireless communication devices. Wireless communication devices can include hardware and software to support wireless connections to wireless networks using different configurations to provide features that enhance performance and power efficiency. A wireless service provider can provide a broad range of services to wireless communication devices that can adapt wireless circuitry to balance high data rate performance with battery saving power efficiency. In a representative embodiment, a wireless service provider and/or a wireless communication device can include support for a Third Generation Partnership Project (3GPP) Long Term Evolution (LTE) or Long Term Evolution Advanced (LTE-A) wireless communication protocol. In some embodiments, the wireless service provider and/or the wireless communication device can also support communication using a "legacy" third generation (and/or an earlier generation) wireless communication protocol. Representative "legacy" protocols include the Third Generation Partnership Project 2 (3GPP2) Code Division Multiple Access (CDMA) 2000 1× (also referred to as 1×RTT or 1×) wireless communication protocol, the 3GPP Universal Mobile Telecommunications System (UMTS) wireless communication protocol, and the 3GPP Global System for Mobile Communications (GSM) wireless communication protocol. The LTE/LTE-A wireless communication protocols can provide improved radio technology and network architectures to support higher data transfer rates, lower latencies, and a higher capacity for communication to multiple wireless communication devices in a geographic area. The LTE/LTE-A wireless communication protocol can include techniques that use multiple transmit and/or receive antennas in parallel to improve signal quality reception by a wireless communication device, e.g., through spatial diversity that can provide for signal reception at different spatial locations of the wireless communication device simultaneously. With multiple receive antennas, the wireless communication device can receive signals from an LTE/LTE-A wireless network through multiple transmission paths, which the wireless communication device can combine to provide a "stronger" receive signal or a higher data rate (due to parallel data transmission).

A wireless communication device can include wireless circuitry that supports communication using one or more different wireless communication protocols and using multiple configurations in accordance with a particular wireless communication protocol. The wireless circuitry can include multiple RF transmit and/or RF receive signal chains, including multiple antennas and parallel signal processing blocks. Each RF receive signal chain, when powered to receive signals, can consume battery power, even when no downlink data is received or when no uplink data is transmitted. The wireless communication device can be configured to transmit and/or receive signals through multiple RF signal chains simultaneously, e.g., as used for multiple input multiple output (MIMO) communication, or for downlink diversity transmissions to the wireless communication device. The wireless communication device can also be configured to transmit and/or receive signals through a single RF signal chain, e.g., via a primary RF signal chain or a secondary RF signal chain, depending on wireless signal conditions. The wireless communication device can also be configured to power down all or portions of the wireless circuitry to conserve battery power, e.g., during discontinuous receive (DRX) modes and/or during idle modes. For an LTE wireless communication protocol, various inactivity timers that can activate power saving modes can be determined by the LTE wireless network to which the wireless communication device is registered and/or connected. The values specified by the LTE wireless network's inactivity timers can be selected to conserve radio frequency resources (e.g., by disconnecting signaling connections for inactive wireless communication devices) and/or to minimize radio resource control signaling traffic (e.g., by avoiding repeated disconnections and re-connections by a wireless communication device with the LTE wireless network). The selection of values for inactivity timers, however, can be not optimal for conserving battery power of the wireless communication device. Thus, methods and apparatuses to improve battery power consumption, while retaining high performance connections between a wireless communication device and a wireless network can be desired.

This application describes methods and apparatuses by which a wireless communication device can be configured to operate using different configurations of wireless circuitry to balance throughput performance and battery power consumption while connected to a wireless network.

SUMMARY OF THE DESCRIBED EMBODIMENTS

The described embodiments relate to methods and apparatuses for managing connections between wireless communication devices and wireless networks. More particularly, the present embodiments describe configuring wireless circuitry in a wireless communication device to receive signals from a Long Term Evolution (LTE) wireless network through different numbers of radio frequency (RF) receive signal chains based on traffic activity and on receive RF signal conditions measured at the wireless communication device.

In one or more embodiments, disabling receive diversity in a wireless communication device reduces power consumption at the wireless communication device. To minimize power consumption, when operating conditions (e.g., signal quality, application data traffic requirements, measured data traffic, etc.) of the wireless communication device permit, receive diversity can be disabled. When a single RF receive signal chain suffices to decode a signaling control channel reliably, receive diversity at the wireless communication device can be disabled to conserve power. When a downlink data activity rate falls below a first threshold measured over a recent time period, receive diversity at the wireless communication device can be disabled. When the downlink data activity rate rises above a second threshold measured at the wireless communication device, receive diversity can be enabled to maximize throughput. When RF receive signal conditions at the wireless communication device indicate decoding reliability issues, e.g., of one or more signaling control channels, receive diversity can be enabled to improve data and signaling reception reliability.

In one or more embodiments, the determination of whether to disable receive diversity is based on operating conditions measured at the wireless communication device. Downlink data activity rates are measured based on information provided in a signaling control channel, e.g., the physical downlink control channel (PDCCH), which provides indications of downlink radio resource grant allocations to the wireless communication device. For low levels of downlink data activity, receive diversity can be disabled when channel conditions permit. When channel conditions do not permit reliable reception of the PDCCH signaling control channel or when downlink data activity increases, receive diversity can be enabled. A second RF receive signal chain in the wireless communication device can be enabled to maximize a signal to interference plus noise ratio (SINR) at the wireless communication device. In another embodiment, when uplink data activity occurs, receive diversity can be enabled when RF receive signal conditions indicate that reliable reception of a physical hybrid automatic repeat request indicator channel (PHICH) cannot occur when receiving with only one RF receive signal chain.

In one or more embodiments, downlink data activity is monitored over a sliding window time period. When a low level of downlink data activity, e.g., at most "m" sub-frames of the last "M" sub-frames include downlink data activity, and when the SINR exceeds a signal quality threshold value, receive diversity at the wireless communication device can be disabled. When a higher level of downlink activity, e.g., at least "n" sub-frames of the last "N" sub-frames include downlink data activity, receive diversity can be enabled. In a representative embodiment, "n" equals one and "N" equals one, so that when reception of downlink data or an indication of downlink radio resource grant allocation occurs in a single sub-frame, receive diversity is enabled substantially immediately for subsequent sub-frames. In a representative embodiment, "m" equals zero, and "M" corresponds to a time period less than a connected discontinuous receive (c-DRX) mode inactivity timer.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood by reference to the following description taken in conjunction with the accompanying drawings.

DETAILED DESCRIPTION OF SELECTED EMBODIMENTS

Figure 1:
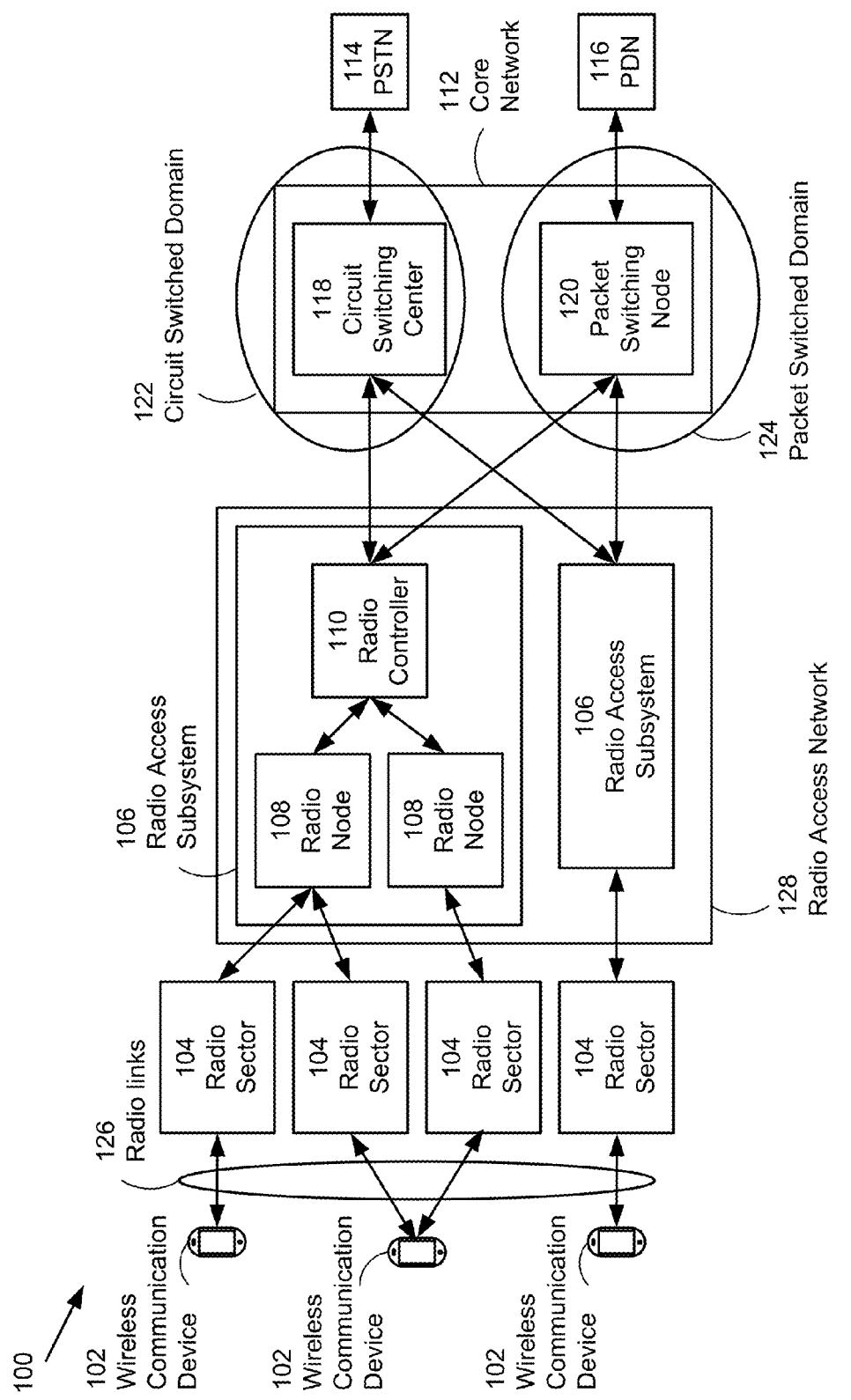
FIG. 1 illustrates components of a generic wireless communication network in accordance with some embodiments.

Wireless networks continue to evolve as network operators deploy equipment for new wireless communication technologies based on ongoing standardization efforts. Wireless communication devices can provide capabilities to communicate with wireless networks based on different wireless communication technologies, e.g. GSM, UMTS, CDMA 2000 1× and LTE/LTE-A, as newer wireless network technologies offer advanced capabilities in parallel with earlier wireless network technologies that can provide greater geographic area coverage and/or different wireless service implementations. The present LTE/LTE-A wireless communication protocols provide for higher data rates through the use of parallel transmission, e.g., using MIMO transmission or carrier aggregation, and for higher reliability, e.g., using transmit diversity in the downlink direction.

To support these advanced communication methods, a wireless communication device can include wireless circuitry with multiple receive signal chains to receive signals through parallel signal paths via separate antennas. To conserve battery power at the wireless communication device, however, the use of only one receive signal chain can prove sufficient to support downlink reception, e.g., during "good" receive signal conditions and/or to receive relatively lower data rate transmissions depending on application traffic requirements. The wireless communication device can be configured to use multiple receive signal chains, a single receive signal chain, or no receive signal chains during a communication session based on a combination of operating conditions, e.g., signal strength, signal quality, downlink data rates, and traffic patterns. To maintain connection stability, the wireless communication device can be configured to ensure a minimum level of reliable reception of signaling traffic from the wireless network. When signal quality conditions and application data traffic requirements and/or patterns indicate that single receiver reception can be used, the wireless communication device can be configured for single receiver reception, and portions of wireless circuitry in the wireless communication device can be powered down (partially or wholly) to reduce power consumption of limited battery resources available in the wireless communication device. In response to changes in signal quality and/or application data traffic requirements or patterns, the wireless communication device can be reconfigured between single receiver, multiple receiver, and "no receiver" modes to balance power consumption and data throughput performance while maintaining reliable connections between the wireless network and the wireless communication device.

It should be understood that implementations of the same methods and apparatuses described herein can apply to wireless communication devices that operate in different types of wireless networks that provide for reception using a single receiver or multiple receivers. A specific example and implementation described herein in relation to an LTE wireless network is presented for simplicity, but the methods and apparatuses disclosed herein can also apply equally to other wireless network environments that use provide communication in which the wireless communication device can be configured for single receiver operation or multiple receiver operation, e.g., an LTE-A wireless network, an 802.11n wireless network, etc.

In an embodiment, the wireless communication device can include wireless circuitry that can be configured for different operating modes. The wireless circuitry can include at least one transmit signal chain and at least two receive signal chains. A transmit signal chain can also be referred to as a transmitter, while a receive signal chain can also be referred to as a receiver. The transmit signal chain can include a portion of wireless circuitry in the wireless communication device to transform (e.g., modulate and encode) digital packets into analog radio frequency waveforms and transmit the RF waveforms via one or more antennas to a wireless network. Similarly, a receive signal chain can include a portion of the wireless circuitry in the wireless communication device to receive RF waveforms through one or more antennas and transform (e.g., demodulate and decode) the RF waveforms into digital packets. A transmitter and receiver combination can also be referred to as a transceiver. In an embodiment, the wireless communication device can be configured to use multiple (e.g., two) receivers in parallel, e.g., to improve reception of signals communicated from the wireless network in the downlink direction using transmit diversity, such as signaling messages, or to use a single receiver, e.g., to minimize power consumption when signaling conditions permit reliable reception with only the single receiver.

The wireless communication device can determine in which mode to operate based on receive signal conditions and current or expected data traffic patterns. In some embodiments, the wireless communication device can determine whether a set of receive signal conditions is satisfied when determining in which mode to operate, e.g., when "good" signal conditions prevail such that reception via one receive signal chain can suffice and after a period of minimal or no data traffic, the wireless communication device can be configured to operate in a mode that receives signals using a first receive signal chain and powers down all or portions of wireless circuitry for the second receive signal chain. Subsequently, when signal conditions change, e.g., when "poor" signal conditions require use of multiple receivers to improve signal reception, or when a level of data traffic exceeds a threshold, the wireless communication device can be configured to operate in a mode that receives signal using multiple receive signal chains, e.g., the first receive signal chain and a second receive signal chain.

In some embodiments, the wireless communication device can provide information in channel status reports to the wireless network, e.g., a channel quality indicator (CQI) and a rank indicator (RI) that can result in the wireless network selecting particular modulation and coding scheme (MCS) values for transmission in the downlink direction. The CQI and RI values communicated to the wireless network can be determined by the wireless communication device based on receive signal conditions. Higher quality receive signal conditions, e.g., strong signals and/or higher signal to noise plus interference ratios, can permit higher downlink data rates and/or higher reliability for signal reception at the wireless communication device. In an embodiment, the wireless communication device can be configured to use a single receiver when downlink traffic is sparse and downlink SINR permits reliable reception of a mandatory signaling channel, e.g., the physical downlink control channel (PDCCH), using only the single receiver (rather than using two receivers in parallel with diversity to improve the effective SINR). Additional control channel information for which the wireless communication device can seek to ensure reliable reception can include hybrid automatic repeat request (HARQ) acknowledge (ACK) and negative acknowledge (NACK) messages in the downlink direction that the wireless network transmits in response to uplink transmissions from the wireless communication device. In some embodiments, when minimal or no downlink traffic from the wireless network to the wireless communication device occurs, the wireless communication device can be configured for single receiver mode or dual receiver mode of operation based on whether receive diversity is required to ensure reliable reception of control messages.

In some embodiments, the wireless communication device can determine a level of downlink data traffic (also referred to as downlink data activity) based at least in part on a number of downlink radio resource allocations provided during a recent past time window of "M" consecutive sub-frames. The indication of downlink radio resource allocation can be provided to the wireless communication device via the PDCCH. When the level of downlink data traffic is "low", e.g., less than a first threshold value of "m" allocations (radio resource grants) during the recent time window of "M" sub-frames, the wireless communication device can be configured for single receiver mode (and the SINR permits reliable reception of the PDCCH when using only one receiver). When the level of downlink data traffic is not "low", e.g., more than a second threshold value of "n" allocations during a recent time window of "N" sub-frames, the wireless communication device can be configured for dual receiver mode (or more generally multiple receiver mode). In an embodiment, N<M, which can bias operation of the wireless communication device toward responsive performance, e.g., enabling receive diversity more quickly than disabling receive diversity. In an embodiment, the second threshold value "n" is set to one, and the number of sub-frames "N" is also set to one, which can provide for enabling receive diversity when a single data packet is received (or downlink radio resource grant provided). In an embodiment, the first threshold value "m" is set to zero, which can correspond to a downlink data inactivity timer that expires after M sub-frames with no downlink radio resources assigned or downlink data received by the wireless communication device. As a radio resource control (RRC) inactivity timer can be set to a value on the order of multiple seconds, while the M sub-frames can correspond to a time period on the order of milliseconds, the methods and apparatuses described herein can provide significant power savings.

In some embodiments, the wireless communication device can be configured to operate using a connected discontinuous receive (c-DRX) mode, in which the wireless communication device maintains an RRC signaling connection with the wireless network, enters a "sleep" state after expiration of a c-DRX inactivity timer, and periodically "wakes" to listen for signaling messages communicated on the PDCCH. In an embodiment, a value for "M", the number of sub-frames over which data activity can be measured to determine whether to disable receive diversity, can be selected to correspond to a time period less than an expiration time period associated with the c-DRX inactivity timer. Thus, the wireless communication device can be configured to enter the single receiver (no receive diversity) mode before the c-DRX timer expires. In an embodiment, a level of downlink data activity can be measured over a sliding window of "M" sub-frames to determine in which configuration to operate. In an embodiment, the level of downlink data activity can be measured by averaging data activity using a set of filtered data activity values. In an embodiment, when enabling or disabling receive signal chains at the wireless communication device, the wireless communication device can communicate a set of one or more channel status reports including CQI and/or RI values that request transmissions "aligned" with the number of receivers active. In an embodiment, the wireless communication device can request "rank one" downlink transmission (e.g., using an RI value of one) to the wireless network before reconfiguring to a single receive chain mode of operation. The wireless communication device can also report CQI values, which can be mapped from measured SINR values, to the wireless network based on a single receive chain mode of operation, e.g., reporting lower CQI values to provide for selection of a lower index MCS by the wireless network when the wireless communication device operates with only a single receive chain.

In some embodiments, the wireless communication device can be reconfigured to use a single receiver (e.g., no receive diversity) when measured receive signal conditions indicate that reception of the PDCCH is reliable, e.g., based on a measured SINR value exceeding a SINR threshold value, and when a downlink data traffic scheduling (resource grant) rate is less than a traffic threshold percentage value, e.g., less than "m" sub-frames include downlink radio resource grants during a recent past time window of "M" sub-frames. In an embodiment, the wireless communication device can be reconfigured to single receiver mode when the downlink data traffic falls below the threshold percentage value and the most recent downlink transmissions, e.g., based on recent RI values communicated by the wireless network to the wireless communication device, indicate rank "one". In an embodiment, when downlink data traffic falls below the threshold percentage value and the most recent downlink transmissions indicate rank "two", the wireless communication device reports a rank indicator preference of "one" to the wireless network before reconfiguring to a single receive chain mode of operation. In some embodiments, the wireless communication device awaits a rank indicator value of "one" from the wireless network in response to the communicated rank indicator preference of "one" before transitioning to the single receive chain mode of operation.

FIG. 1 illustrates a representative "generic" wireless network 100 that can include a wireless communication device 102 connected by one or more radio links 126 to one or more radio sectors 104 provided by a radio access network 128. Each radio sector 104 can represent a geographic area of radio coverage emanating from an associated radio node 108 using a radio frequency channel operating at a selected frequency. Each radio node 108 can generate one or more radio sectors 104 to which the wireless communication device 102 can connect by one or more radio links 126. In some wireless networks 100, the wireless communication device 102 can be connected to more than one radio sector 104 simultaneously. The multiple radio sectors 104 to which the wireless communication device 102 can be connected can emanate from a single radio node 108 or from separate radio nodes 108 that can share a common radio controller 110. A group of radio nodes 108 together with the associated radio controller 110 can be referred to as a radio access subsystem 106. Typically each radio node 108 in a radio access subsystem 106 can include a set of radio frequency transmitting and receiving equipment mounted on an antenna tower, and the radio controller 110 connected to the radio nodes 108 can include electronic equipment for controlling and processing transmitted and received radio frequency signals. The radio controller 110 can manage the establishment, maintenance and release of the radio links 126 that connect the wireless communication device 102 to the radio access network 128.

Radio resources that form the radio links 126 in the radio sectors 104 can be shared among multiple wireless communication devices 102 using a number of different multiplexing techniques, including time division, frequency division, code division, space division and combinations thereof. A radio resource control (RRC) signaling connection can be used to communicate between the wireless communication device 102 and the radio controller 110 in the radio access subsystem 106 of the radio access network 128 including requests for and dynamic allocations of radio resources to multiple wireless communication devices 102. The wireless communication device 102 can be connected to the radio access network 128 through one or more radio sectors 104 simultaneously. In some embodiments, the wireless communication device 102 and the wireless network 100 support diversity communication and/or multiple input multiple output (MIMO) communication, in which radio frequency signals are sent through two or more separate wireless communication paths (also referred to as channels), e.g., to provide redundant data through the multiple paths to improve signal reception and decoding which can in turn improve downlink performance, or to provide additional data through the multiple paths to increase the downlink data rates.

The radio access network 128, which provides radio frequency air link connections to the wireless communication device 102, connects also to a core network 112 that can include a circuit switched domain 122, usually used for voice traffic, and a packet switched domain 124, usually used for data traffic. Radio controllers 110 in the radio access subsystems 106 of the radio access network 128 can connect to both a circuit switching center 118 in the circuit switched domain 122 and a packet switching node 120 in the packet switched domain of the core network 112. The circuit-switching center 118 can route circuit switched traffic, such as a voice call, to a public switched telephone network (PSTN) 114. The packet switching node 120 can route packet switched traffic, such as a "connectionless" set of data packets, to a public data network (PDN) 116.

Figure 2:
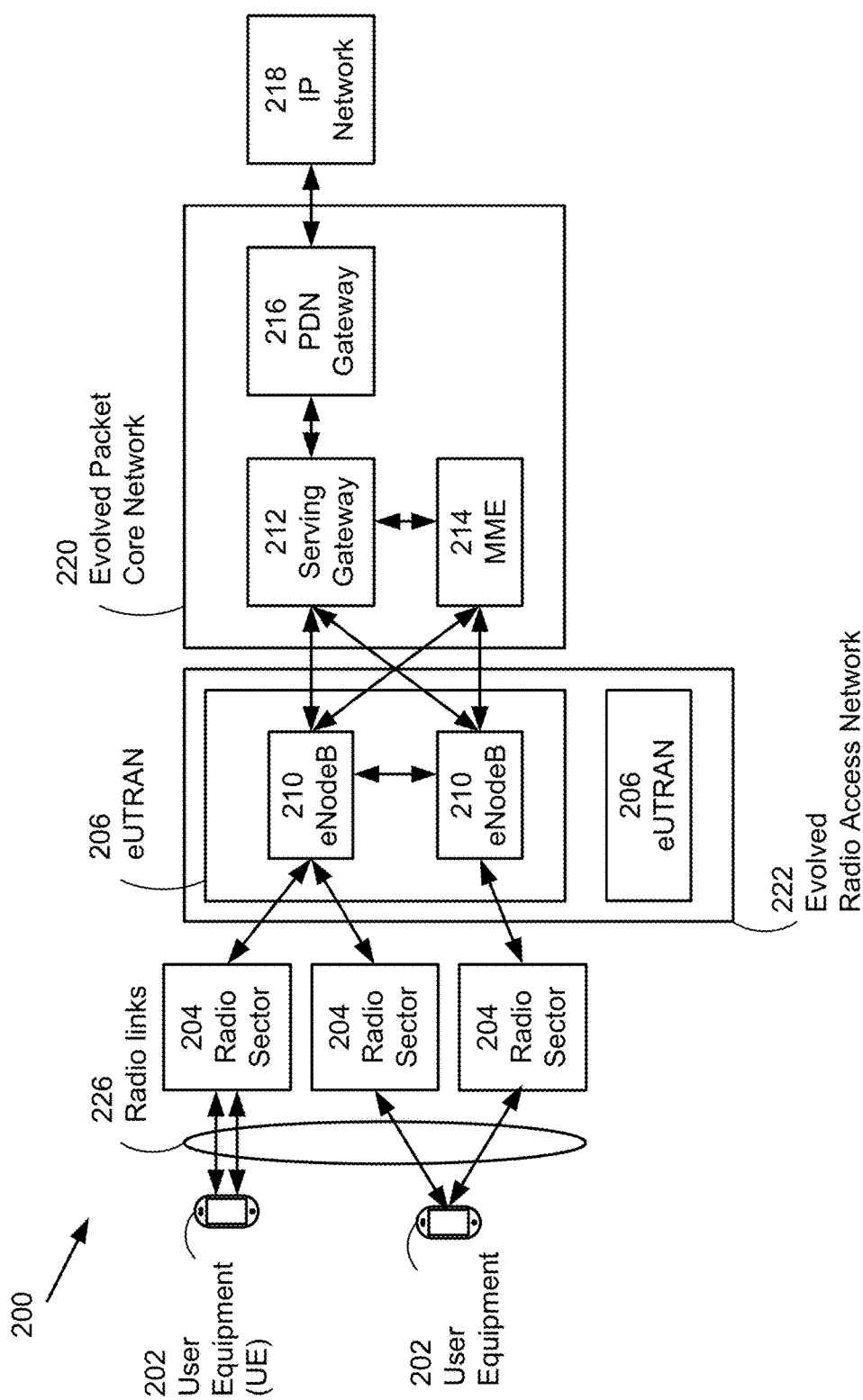
FIG. 2 illustrates components of an LTE (or LTE-Advanced) wireless communication network in accordance with some embodiments.

FIG. 2 illustrates a representative Long Term Evolution (LTE) wireless network 200 designed as a packet switched network exclusively. A user equipment (UE) 202 can connect to an evolved radio access network 222 through one or more radio links 226 associated with radio sectors 204, each radio sector 204 emanating from an evolved Node B (eNodeB) 210. The eNodeB 210 can include the functions of both transmitting and receiving base stations (such as the radio node 108 in the wireless network 100) as well as base station radio controllers (such as the radio controller 110 in the wireless network 100). An equivalent "core network" of the LTE wireless network 200 is an evolved packet core network 220 including serving gateways 212 that interconnect the evolved radio access network 222 to public data network (PDN) gateways 216 that connect to external internet protocol (IP) networks 218. Multiple eNodeB 210 can be grouped together to form an eUTRAN 206. The eNodeB 210 can also be connected to a mobility management entity (MME) 214 that can provide control over connections for the user equipment 202. The eNodeB 210 can control allocation of radio resources for the radio links 226 to the user equipment 202. The eNodeB 210 can communicate paging messages to the user equipment 202, including paging messages to establish an RRC connection with the user equipment 202 and transition from an RRC idle state to an RRC connected state. The user equipment 202 can be required to be in an RRC connected state in order to communicate application data packets and signaling messages. The user equipment 202 can communicate information to the eNodeB 210 that is used by the LTE wireless network 200 to determine downlink and uplink resource scheduling. The user equipment 202 can provide information in the form of channel status reports that can include channel quality indicators, rank indicators, and precoding matrix indicators. The eNodeB 210 can determine downlink transmission parameters, e.g., the use of MIMO transmissions, based at least in part on the reported values in the channel status reports provided by the user equipment 202. The eNodeB 210 can schedule radio resources for the UE 202 and provide indications of radio resource allocations using signaling messages communicated in a physical downlink control channel (PDCCH). The UE 202 can monitor the PDCCH to determine when radio resources are assigned to the particular UE 202 for downlink transmission from the eNodeB 210 or for uplink transmission to the eNodeB 210. The eNodeB 210 can communicate the PDCCH using transmit diversity, and the UE 202 can be configured for single receiver or dual receiver operation of the PDCCH.

The eNodeB 210 can also communicate rank indicator (RI) values for downlink transmissions that indicate whether MIMO downlink transmission is scheduled. The UE 202 can monitor a level of data traffic activity based on a frequency of radio resource assignment to the UE 202 communicated on the PDCCH. The UE 202 can be configured to operate in a single receiver or dual receiver mode based at least in part on the monitored level of data traffic activity. When the level of data traffic activity is "low" and the PDCCH can be reliably received using a single receiver, the UE 202 can be configured to operate with a single receiver and "power down" at least in part a second receiver to conserve power. When the level of data traffic activity is "not low" or the PDCCH cannot be reliably received using the single receiver, the UE 202 can be configured to operate with multiple receivers, e.g., in a dual receiver mode. The level of data traffic activity can be characterized, in some embodiments, based on measuring a rate of radio resource assignment to the UE 202, e.g., counting a number "m" of sub-frames in which downlink radio resources are assigned to the UE 202 for downlink data traffic transmission within a recent time period, e.g., over a sliding window of "M" sub-frames. When the rate m/M falls below a rate threshold value, and when a measured signal strength and/or quality, e.g., an SNR value, indicates that the PDCCH (or other signaling channels) can be reliably received using a single receiver, the UE 202 can be configured to use a single receiver rather than multiple receivers.

Figure 3A:
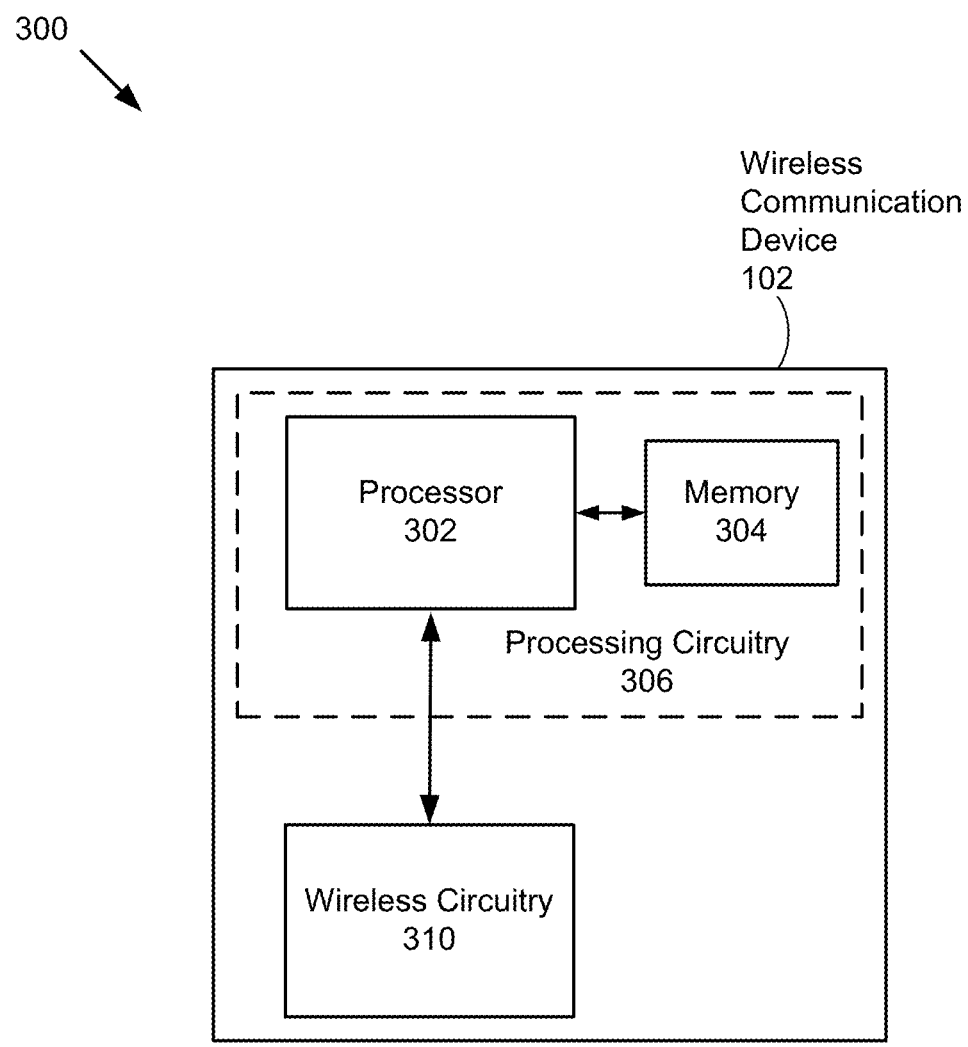
FIG. 3A illustrates a representative set of processing elements of a wireless communication device in accordance with some embodiments.

FIG. 3A illustrates a diagram 300 of a representative set of processing elements of a wireless communication device 102 in accordance with some embodiments. The wireless communication device 102 can include a set of wireless circuitry 310 that can provide for communication with a wireless network, e.g., the LTE wireless network 200. The wireless circuitry 310 in the wireless communication device 102 can include one or more wireless circuitry modules including processors and wireless circuitry to transmit and receive wireless signals according to various wireless communication protocols. A wireless circuitry module (which can also be referred to as a wireless subsystem) of the wireless communication device 102 can include transmitters and receivers to provide signal processing of radio frequency wireless signals formatted according to wireless communication protocols, e.g., according to an LTE wireless communication protocol, or another cellular wireless communication protocol. In some embodiments, the wireless circuitry module can include components such as: processors and/or specific-purpose digital signal processing (DSP) circuitry for implementing functionality such as, but not limited to, baseband signal processing, physical layer processing, data link layer processing, and/or other functionality; one or more digital to analog converters (DACs) for converting digital data to analog signals; one or more analog to digital converters (ADCs) for converting analog signals to digital data; radio frequency (RF) circuitry (e.g., one or more amplifiers, mixers, filters, phase lock loops (PLLs), and/or oscillators); and/or other components. The wireless circuitry module can be also referred to as a radio in some embodiments.

The wireless circuitry 310 of the wireless communication device 102 of FIG. 3A can include wireless processing blocks that process radio frequency signals for transmission and/or reception. The wireless circuitry 310 of the wireless communication device 102 can be connected to high layer processing circuitry 306 that includes a host/application processor 302 connected to memory 304. In some embodiments, the wireless circuitry 310 includes its own wireless control processor, e.g., as shown by the baseband processor 328 in FIG. 3B. In some embodiments, the wireless circuitry 310 can be controlled by one or more processors contained therein and/or by the host/application processor 302 to be configured in one of several different operating modes described herein. In some embodiments, the wireless circuitry 310 is configured to switch between different operating modes based on requirements for communication with a wireless network, e.g., the LTE wireless network 200, and/or based on requirements to reduce power consumption by the wireless communication device 102. The wireless circuitry 310 can be configured to switch between different operating modes that provide for single receiver reception of signals from the wireless network or dual receiver reception of signals from the wireless network. In some embodiments, the wireless circuitry 310 can be configured for different operating modes based on a set of signal conditions, e.g., measurements of receive signal strength and/or signal quality for the wireless network. In some embodiments, the wireless circuitry 310 can be configured for different operating modes based on traffic patterns associated with one or more applications that generate and/or consume data traffic from the wireless network. In some embodiments, the processing circuitry 306 and/or the wireless circuitry 310 can determine a set of values to include in one or more channel status reports to send to the LTE wireless network 200 in advance of switching between different operating modes. The LTE wireless network 200 can adjust downlink transmissions, e.g., from a MIMO mode to a transmit diversity mode, in order to align the format used for downlink transmissions to match to a receiver configuration of the wireless communication device 102, e.g., when changing between a dual receiver mode and a single receiver mode. The wireless communication device 102 can determine values of a channel quality indicator (CQI) that corresponds to the use of one receiver and provide that information to the LTE wireless network 200 sufficiently in advance so that the LTE wireless network 200 can send data in an appropriate format (e.g., with a modulation coding scheme that can be decoded with only one receiver given the receive conditions at the wireless communication device 102). The wireless communication device 102 can also provide a rank indicator (RI) value of "one" in advance of switching to a single receiver mode so that the LTE wireless network 200 does not provide MIMO transmission to the wireless communication device 102 when only one receiver at most can be available to receive signals from the LTE wireless network 200. In an embodiment, the LTE wireless network 200, e.g., via the eNodeB 210, provides a rank indication to the wireless communication device 102 in a physical downlink control channel (PDCCH) in response to one or more channel status reports, e.g., as part of a scheduled grant. In an embodiment, the wireless communication device 102 waits for a rank indication of one from the LTE wireless network 200 before switching a configuration mode of the wireless communication device 102 from a dual receiver mode to a single receiver mode. In an embodiment, the wireless communication device 102 estimates a time for the eNodeB 210 and/or other network elements of the LTE wireless network 200 to respond to channel status report information provided by the wireless communication device 102 and sends the channel status reports in advance of changing an operating mode by an estimated time period in order to realize a change in parameters for downlink transmissions from the LTE wireless network 300 to the wireless communication device 102, e.g., a rank indication value of one and/or a change in values of a modulation coding scheme used to correspond to the use of one receiver for reception of signals from the LTE wireless network 200 while configured for single receiver operation.

Figure 3B:
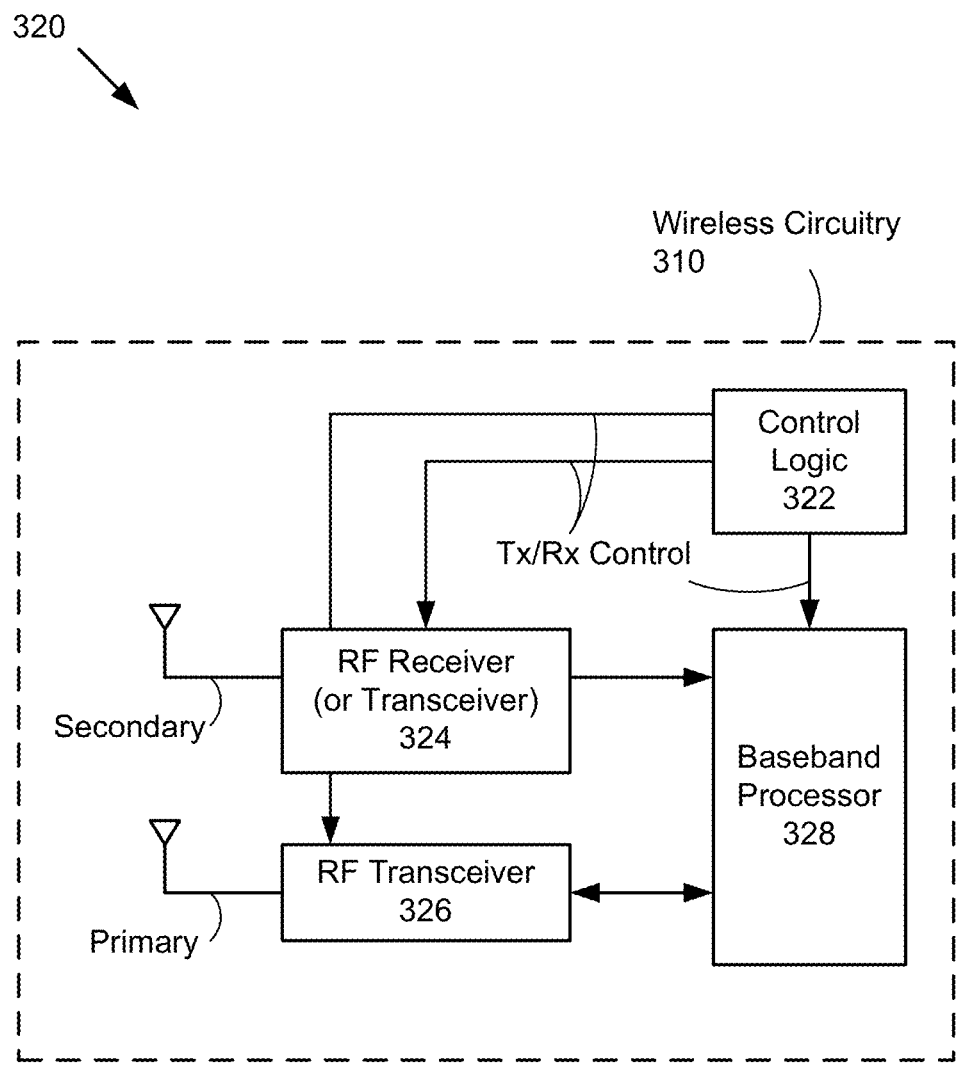
FIG. 3B illustrates another representative set of processing elements of a wireless communication device in accordance with some embodiments.

FIG. 3B illustrates a diagram 320 of a representative set of processing elements of wireless circuitry 310 of a wireless communication device 102, in accordance with some embodiments. The wireless circuitry 310 can be used to convert digital data packets to analog radio frequency waveforms to transmit to a wireless network (e.g., the LTE wireless network 200) and to receive, decode, and convert analog radio frequency waveforms from the wireless network using one receive signal chain (also referred to herein as a receiver) singly or two receive signal chains in parallel. The wireless circuitry 310 can include a primary receive signal chain that receives signals via a primary antenna and processes the received signals by a radio frequency transceiver 326 (which can include a radio frequency transmitter and a radio frequency receiver), which in turn provides the processed received signals to a baseband processor 328 for further processing. The primary antenna and the radio frequency transceiver 326 can also transmit signals provided by the baseband processor 328, e.g., back to the LTE wireless network 200. The baseband processor 328 can operate in accordance with an LTE wireless communication protocol for signals received from and transmitted to the LTE wireless network 200. In some embodiments, the baseband processor 328 can also operate in accordance with another wireless communication protocol, e.g., a GSM, UMTS, CDMA 2000 1×, or other cellular wireless communication protocol. The wireless circuitry 310 can include a secondary receive signal chain associated with a second antenna and a radio frequency receiver 324 (separate from the radio frequency transceiver 326), which can provide received radio frequency signals to the baseband processor 328 for processing in parallel with signals received and transmitted by the radio frequency transceiver 326. (In some embodiments, the secondary receive signal chain can include an RF transceiver in place of the RF receiver 324.) The RF receiver 324 and the RF transceiver 326 can accept transmit and receive (Tx/Rx) control signals from control logic 322 included in (and/or associated with) the wireless circuitry 310. The control logic 322 can communicate Tx/Rx control signals to the baseband processor 328 as well. The control logic 322 can control the use of the "secondary" RF receiver 324 and the "primary" RF transceiver 326 to operate in different configuration modes described herein, including a single receiver mode and a dual receiver mode. In some embodiments, the Tx/Rx control signals from the control logic 322 can cause all or portions of the RF receiver 324 and/or the RF transceiver 326 to be powered down in a particular configuration or operating mode and to be powered up for operation in another configuration or operating mode.

The wireless communication device 102 can send one or more channel status reports including values that indicate a preference for "lower data rate" transmissions and/or "lower rank" transmissions in the downlink direction from the LTE wireless network 200. The channel status reports can be sent by the wireless communication device 102 to the LTE wireless network 200 in advance of switching operating modes, e.g., between a single receiver operational mode to a dual receiver operational mode or vice versa. The eNodeB 210 can provide a "rank 1" indication and/or a change in modulation coding scheme (MCS) value in a scheduling grant to the wireless communication device 102 in response to (and/or based at least in part on) the channel status reports provided by the wireless communication device 102.

In some embodiments, the wireless communication device 102 can adjust reported values of the channel status reports, e.g., the CQI and/or RI values, in order to ensure and/or improve the decoding success at the wireless communication device 102 for downlink data transmissions from the LTE wireless network 200 received by the wireless communication device 102 operating in a particular configuration, e.g., a single receiver operating mode. Before changing to a single receiver configuration, and/or while operating in a single receiver configuration, the wireless communication device 102 can communicate a rank indicator value of "one" to the LTE wireless network 200. In addition, the wireless communication device 102 can adjust CQI values to account for the use of only one receiver for decoding downlink transmissions. CQI values can correspond to calculated signal to interference plus noise ratios (SINR) measured by the receive signal processing wireless circuitry of the wireless communication device 102. SINR values can be mapped to appropriate CQI values using a formula, algorithm, and/or table lookup procedure.

Figure 4:
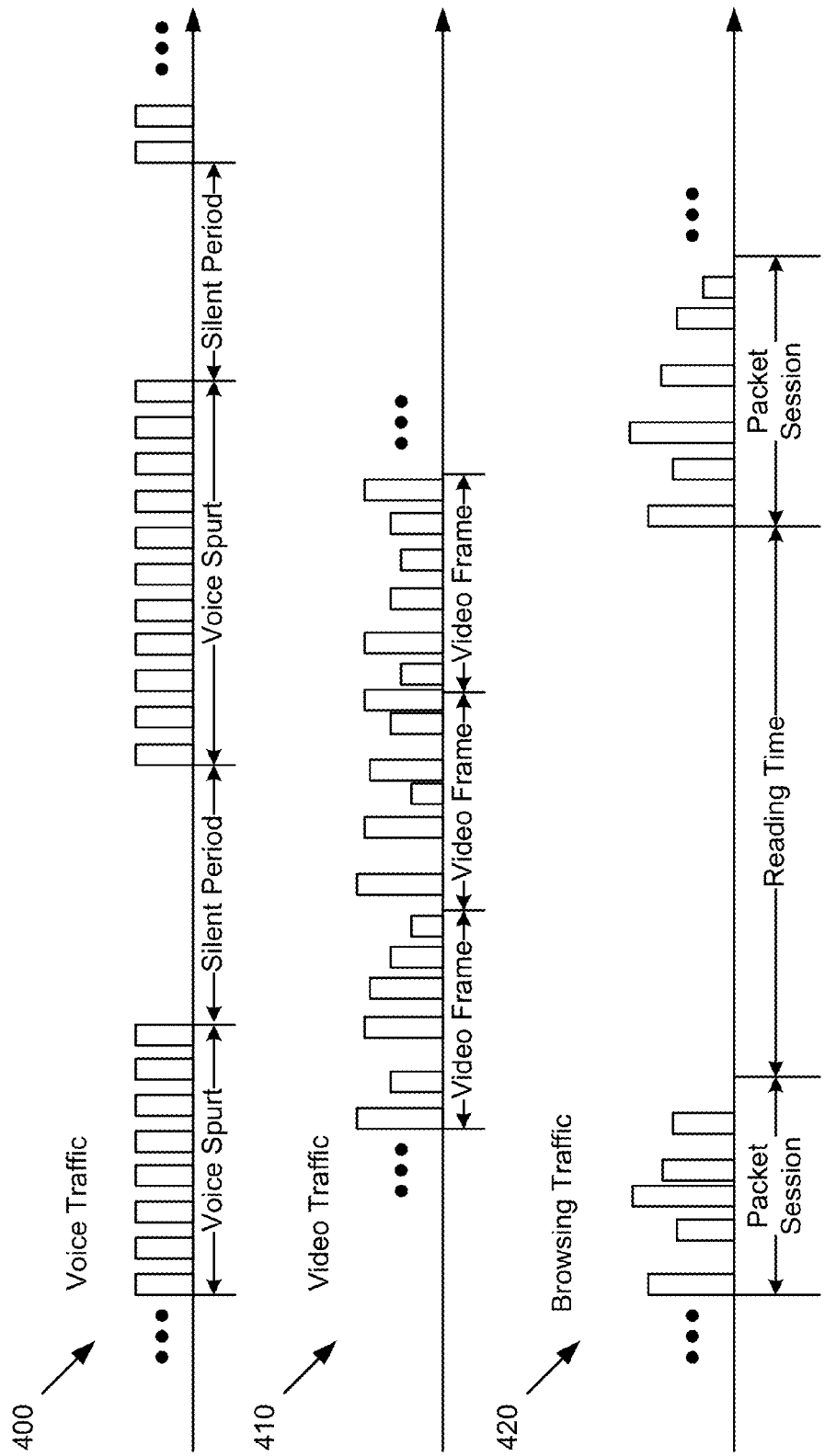
FIG. 4 illustrates a set of traffic models for different applications used by a wireless communication device in accordance with some embodiments.

FIG. 4 illustrates a set of diagrams for different data traffic patterns associated with different types of communication by the wireless communication device 102. Data traffic between the wireless communication device 102 and the LTE wireless network 200 can be characterized by periods of data activity interspersed by periods of data inactivity. Data activity can include data packets of uniform size or variable size, with uniform or variable spacing between data packets during a period of data activity. Data inactivity time periods can vary in length depending on the underlying application that generates the data packets for the communication session. FIG. 4 illustrates typical data traffic patterns for voice, video, and Internet browsing data traffic. Voice data traffic can be characterized by a series of fixed size voice data packets that are transmitted at a constant rate with a constant, fixed inter-arrival time between each voice data packet within a burst of voice data packets. The voice data traffic pattern 400 shown in FIG. 4 can correspond to downlink (or uplink) voice data traffic, with one direction of a voice conversation including voice bursts generated by a user interspersed with "silent" periods during which another user communicates. The voice data traffic pattern 400 illustrates a series of voice "spurts", e.g., which can correspond to downlink data traffic received by the user of the wireless communication device 102 from the eNodeB 210, and silent time periods, during which the user of the wireless communication device 102 can be communicating and therefore transmitting in the uplink direction to the eNodeB 210. Video data traffic can be characterized, as illustrated by the video data traffic pattern 410 in FIG. 4, by a constant video frame rate, with each video "frame" including a set of variable size data packets with variable inter-arrival times between the variable size data packets. Both the amount of data in a packet and time between packets can vary within a constant frame rate video data traffic pattern 410. Internet browsing data traffic, as illustrated by the browsing traffic pattern 420 in FIG. 4, can be characterized by variable length (in time) packet sessions interspersed with variable length (in time) "quiet" sessions. In an embodiment, a user of the wireless communication device 102 can be engaged in web browsing, e.g., selecting links, objects, or web pages to view. Information can be communicated to the user of the wireless communication device 102 using variable size data packets, e.g., transmission control protocol (TCP) segments, corresponding to different objects on a viewed web page. The data packets for Internet browsing sessions can vary in size and in inter-arrival time between the data packets during the packet session. Individual packet sessions can be spaced apart by time periods during which the user "consumes" (e.g., reads) the communicated data packets. "Reading time" between user selections can result in extended time periods of data inactivity during an Internet browsing session. Additional data traffic patterns can include periodic (widely spaced) downlink transmissions associated with push notifications or uplink transmissions associated with "pull" email checks. Each downlink or uplink notification can last a short period of time followed by a much longer time period of data inactivity. Many different data traffic patterns include time periods during portions of wireless circuitry can be configured to conserve power, e.g., by powering down a secondary receive signal chain when receive diversity can be not required, and cannot adversely affect performance at the wireless communication device 102.

Figure 5:
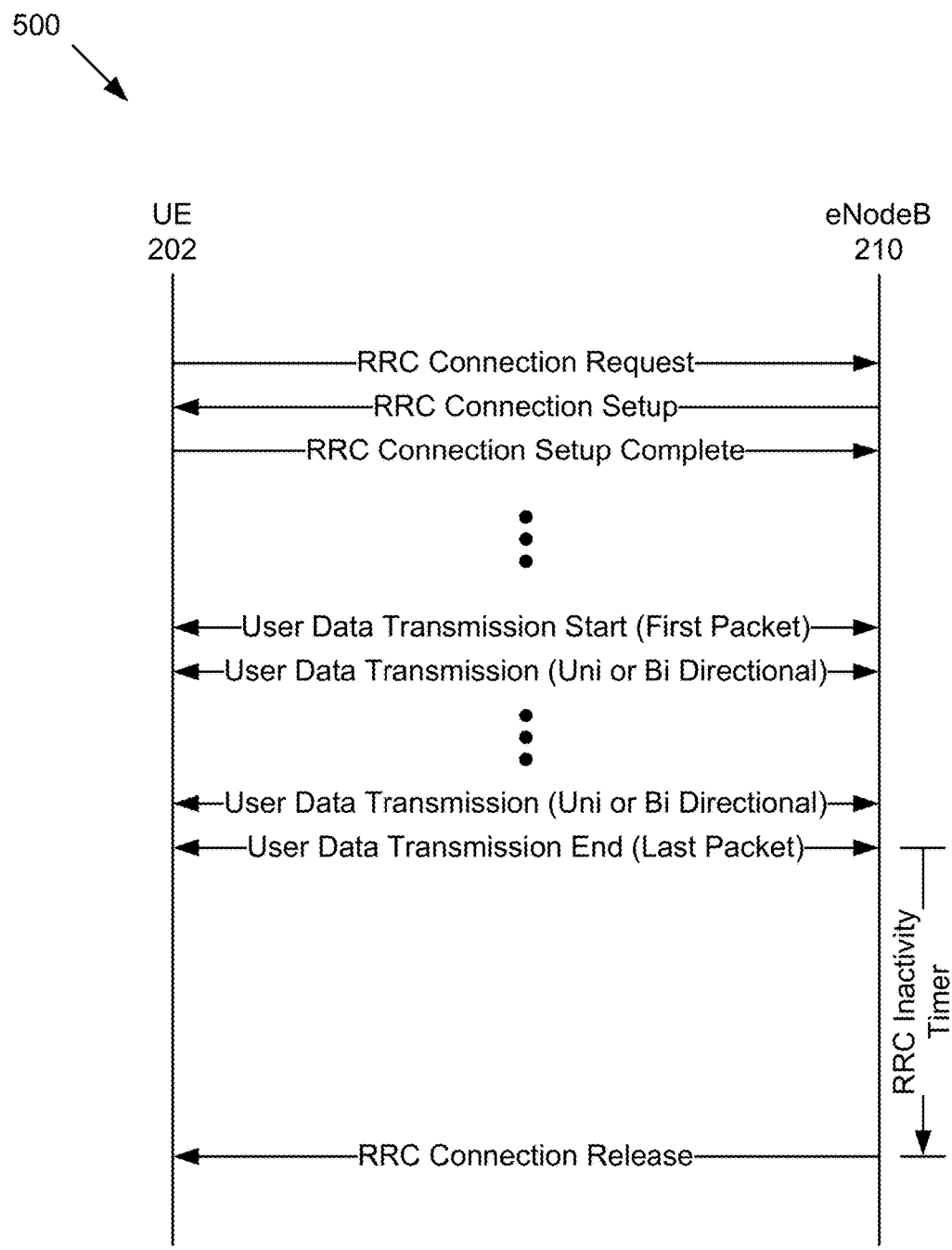
FIG. 5 illustrates establishment and release of a communication session between a wireless communication device and a network element of a wireless network in accordance with some embodiments.

FIG. 5 illustrates a diagram 500 of the establishment and release of a communication session between the UE 202 (or equivalently the wireless communication device 102) and the eNodeB 210 (or equivalently the radio access subsystem 106) of the LTE wireless network 200 (or equivalently the generic wireless network 100). The UE 202 initiates establishment of a radio resource control (RRC) connection, e.g., in response to a mobile originated data connection or a mobile terminated data connection (such as after receiving a page indication). After the RRC connection is established, a series of "user data" transmissions can occur. The user data can include a mixture of one or more data traffic types (e.g., voice, video, Internet browsing). User data traffic can be exchanged between the UE 202 and the eNodeB 210 bi-directionally, e.g., in the uplink and downlink directions, or in a single direction, e.g., in the uplink or the downlink direction. When the user data traffic communication is complete, a period of data inactivity occurs, during which time an inactivity timer, e.g., the RRC inactivity timer, can elapse. When the RRC inactivity timer expires, the eNodeB 210 can release the RRC connection between the UE 202 and the LTE wireless network 200, and the UE 202 can enter an RRC idle state. In a UE 202 configured for DRX operation, the UE 202 can enter an idle DRX "sleep" state and periodically "wake" to monitor a signaling control channel, e.g., the PDCCH, for signaling messages providing an indication of data available for transfer from the eNodeB 210 to the UE 202. The communication session illustrated in FIG. 5 includes three distinct time periods: connection setup, data transfer, and post-transfer inactivity. An amount of data activity during the connection setup time period is governed by communication of control signaling, which in general does not require a high bandwidth, high data rate transmission. The data activity during the data transfer time period can be characterized by data traffic patterns for the type of communication session ongoing, e.g., as illustrated by the different data traffic patterns shown in FIG. 4. Following the data transfer time period, while the RRC inactivity timer is counting, no data traffic can be communicated. During each of the three distinct time periods, wireless circuitry in the UE 202 can be configured to balance performance (e.g., reliability and/or data throughput) against power consumption (e.g., to save limited battery resources.) During the connection setup, if receive signal conditions permit the reception of control signaling messages, e.g., via the PDCCH, reliably using only one radio receive signal chain, then the UE 202 can be configured accordingly to conserve power. During the data transfer time period, based on data traffic patterns, some time periods of data inactivity can occur, and the UE 202 can be configured to power down at least one receive signal chain until data activity resumes. During the time period following the last data packet of the communication session, the UE 202 can be configured for single receiver operation when receive signal quality permits reception of control signals reliably using only a single receive signal chain.

Figure 6:
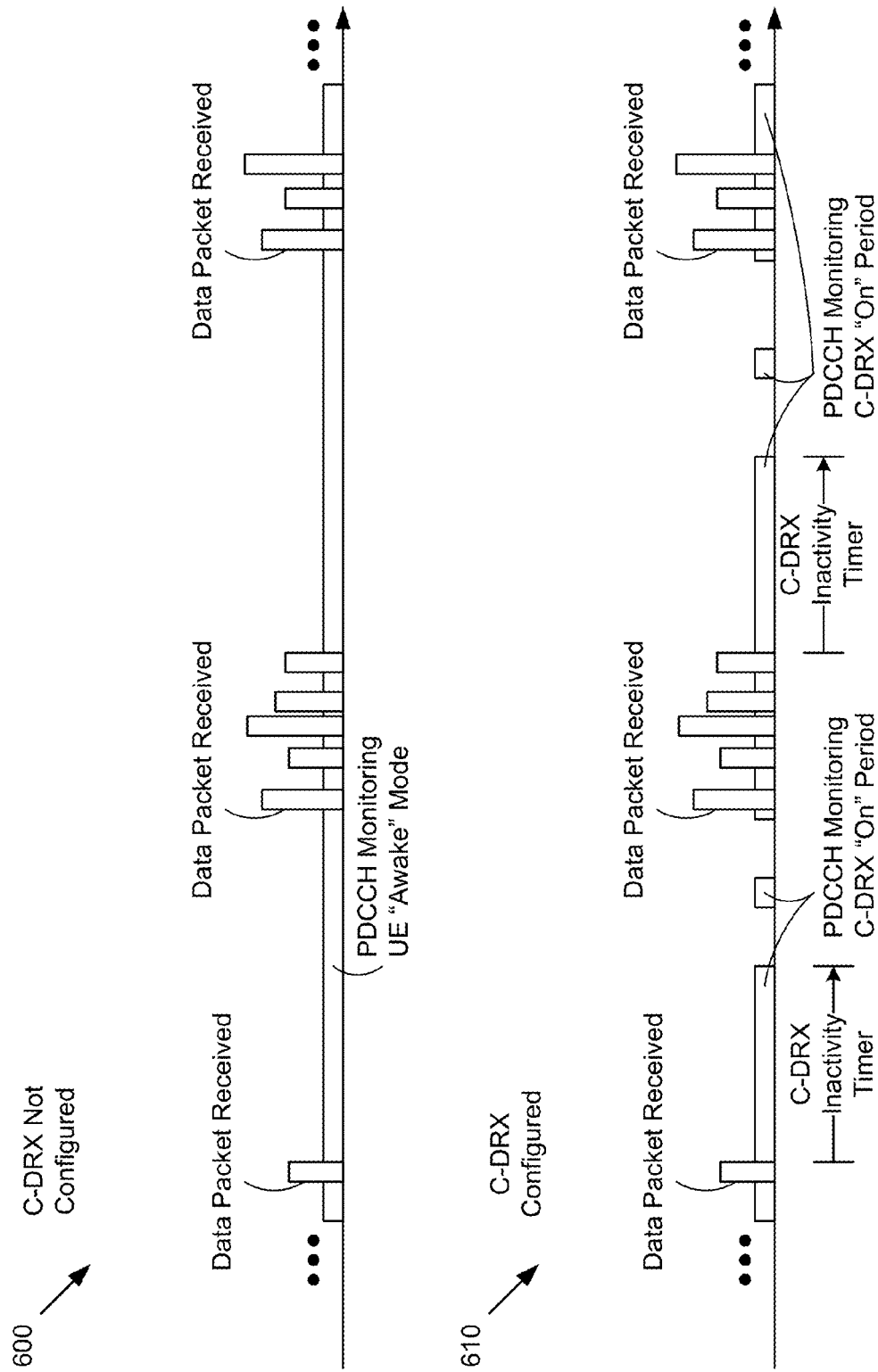
FIG. 6 illustrates "awake" time periods for a wireless communication device during a communication session with a wireless network for different discontinuous receive (DRX) modes in accordance with some embodiments.

The LTE wireless communication protocol includes a mode of operation for the wireless communication device 102 known as a "connected" discontinuous receive (c-DRX) mode. The LTE wireless network 200 can configure the wireless communication device 102 to use the c-DRX mode to conserve power under select circumstances. The c-DRX mode can provide power savings when data traffic occurs in bursts interspersed with time periods of data inactivity that are shorter than a time period for the RRC inactivity timer to expire. FIG. 6 illustrates representative data traffic patterns with "awake" (or "ON") time periods of the wireless communication device 102 during a communication session with the LTE wireless network 200 for when a c-DRX mode is configured and when the c-DRX mode is not configured. The data traffic pattern 600 illustrates that the wireless communication device 102 (UE 202) can be "awake" during time periods between bursts of data packets received by the wireless communication device 102 from the eNodeB 210. The wireless communication device 102 can be configured to remain "awake" to monitor a control signaling channel, e.g., the PDCCH, in between the data packets (e.g., when the data packets are spaced sufficiently close that the RRC connection release timer does not expire). During the inactive time periods between the bursts of data packets, when no data is being transferred, the wireless communication device 102 can likely operate in a single receive signal chain (no receive diversity) configuration. The data traffic pattern 610 illustrates the wireless communication device 102 (UE 202) "wake" time periods with the c-DRX mode enabled. The LTE wireless network 200 can configure the wireless communication device 102 to wait for a time period, specified by a value for a c-DRX inactivity timer, after a data packet is received before reconfiguring to "sleep" to conserve power. The value for the c-DRX inactivity timer can be less than the value for the RRC connection release timer, however, the wireless communication device 102 can continue to consume power while the c-DRX inactivity timer counts. Even with the wireless communication device 102 configured for the c-DRX mode, additional power savings can be realized by configuring the wireless communication device 102 to not user receive diversity (when possible) for a portion of the "awake" time periods before entering the "sleep" time periods. Similarly during the brief "awake" time periods, during which the wireless communication device 102 listens for control signaling messages on the PDCCH, a single receive signal chain, rather than multiple receive signal chains, can be used to conserve power, when signal quality conditions indicate reliable reception of the PDCCH can be realized using only a single receive signal chain.

Figure 7:
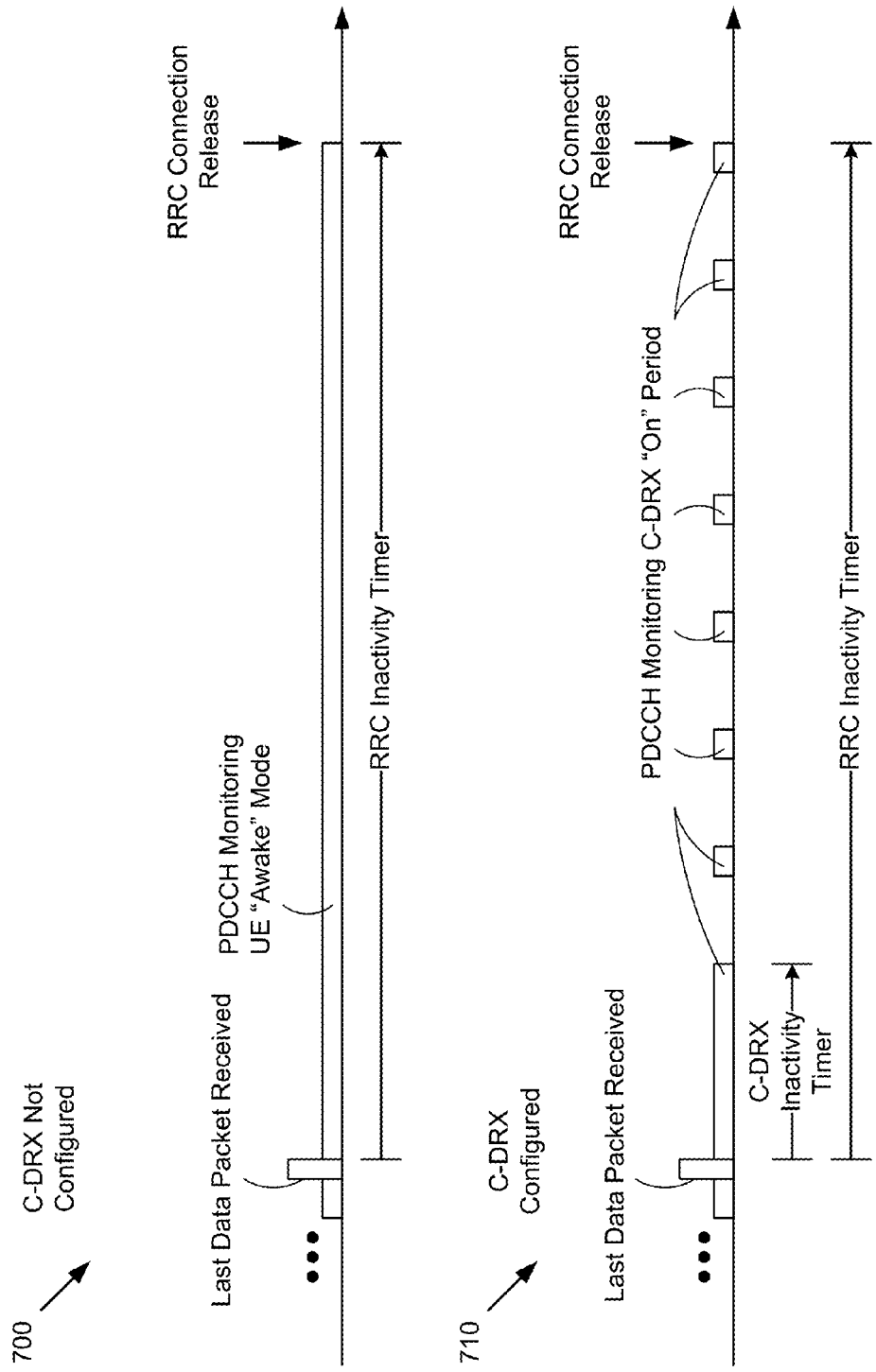
FIG. 7 illustrates "awake" time periods for a wireless communication device at the end of a communication session with a wireless network for different DRX modes in accordance with some embodiments.

FIG. 7 illustrates representative "awake" time periods for the wireless communication device 102 at the end of a communication session with the wireless network 200 for different DRX modes. When the wireless communication device 102 is not configured for a c-DRX mode, as shown by the diagram 700 in FIG. 7, after the last data packet is received by the wireless communication device 102, the wireless communication device 102 can remain in an "awake" mode during which to monitor a signaling control channel, e.g., the PDCCH, for any indications of additional data traffic until the RRC inactivity timer expires. Upon expiration of the RRC inactivity timer, the wireless communication device 102 can receive an RRC connection release message from the wireless network 200, e.g., from the eNodeB 210, and can enter an idle mode. The relatively long time period between the end of the last data packet and the RRC connection release can occur for any data communication session, irrespective of the data traffic type occurring during the data communication session. The LTE wireless network 200 can establish a value for the RRC inactivity timer, which in some embodiments can be on the order of 10 seconds in length. As such, a method to reduce power consumption during the timer period between the last data packet and the RRC connection release can improve battery power life. When the wireless communication device 102 is configured to operate in a c-DRX mode, following the last data packet receipt, the wireless communication device 102 can remain in an "awake" state until the expiration of the c-DRX inactivity timer. While a value for the c-DRX inactivity timer can be less than a value for the RRC inactivity timer, the c-DRX inactivity time period can still extend for a timer period longer than required for use of multiple receive signal chains by the wireless communication device 102. The wireless communication device 102, after the expiration of the c-DRX inactivity timer, can enter the c-DRX mode and can "wake" from a "sleep" mode periodically to monitor a signaling control channel, e.g., the PDCCH. After the last data packet is received, the wireless communication device 102 can be reconfigured to use a single receive signal chain, as described further herein, when signal conditions permit reliable reception of the signaling control channel using a single receive signal chain rather than using multiple receive signal chains, thereby conserving battery power of the wireless communication device 102.

Figure 8:
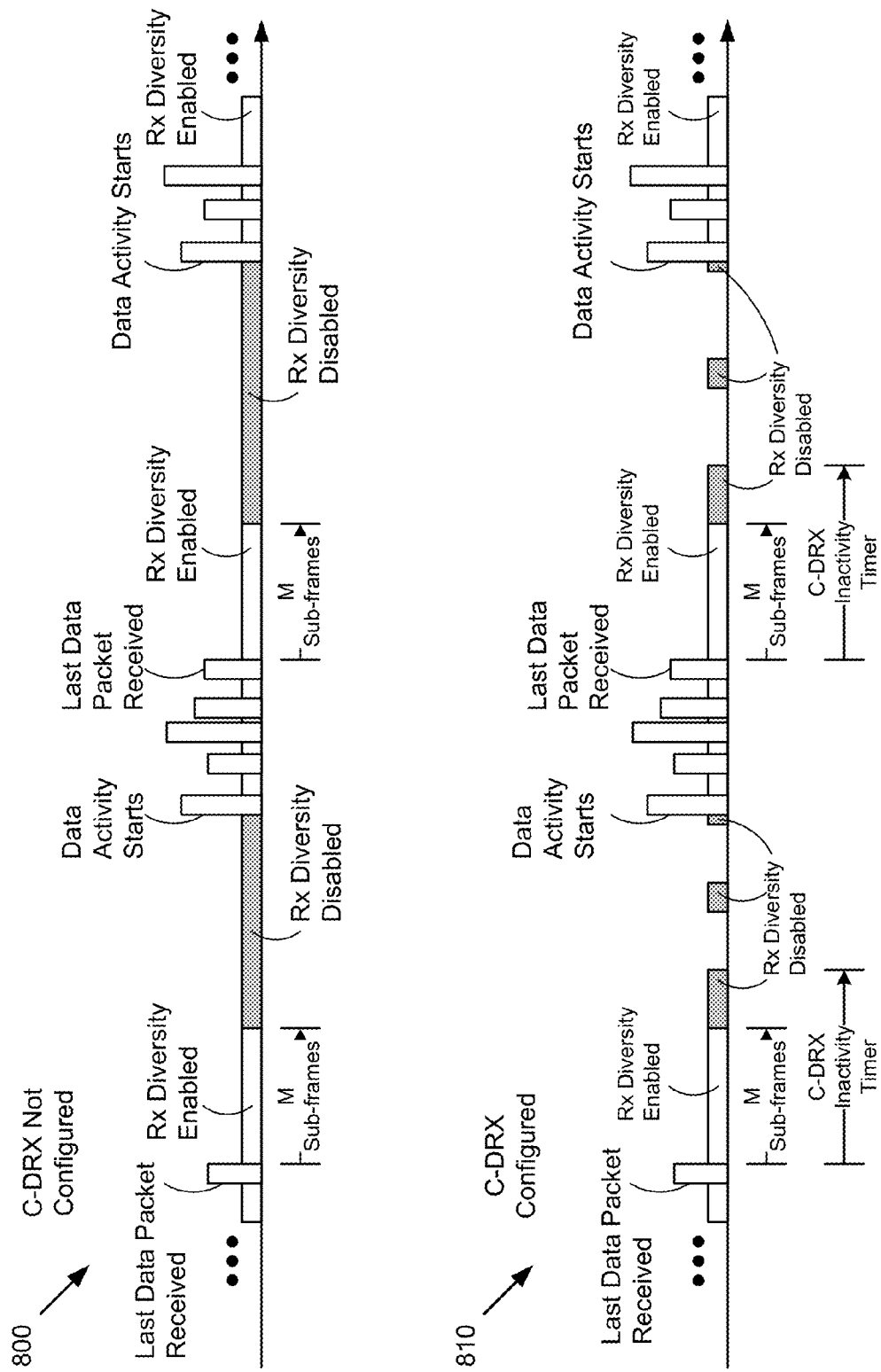
FIG. 8 illustrates different configuration mode time periods for a wireless communication device during a communication session with a wireless network for different DRX modes in accordance with some embodiments.

FIG. 8 illustrates a set of time periods over which configurations of a wireless communication device 102 change during a communication session with a wireless network, e.g., LTE wireless network 200. When the wireless communication device 102 is not configured to operate in accordance with a c-DRX mode, as illustrated by diagram 800, with data traffic occurring in discrete bursts separated by "quiet" time periods, power consumption can be reduced by reconfiguring the wireless communication device 102 to disable receive diversity, e.g., use a single receive chain, after a data inactivity time period. The data inactivity time period parameters illustrated in FIG. 8 illustrate transitioning from a receive diversity enabled mode to a receive diversity disabled mode after M sub-frames are received with no data packets (or no downlink data resources assigned by the eNodeB 210 to the wireless communication device 102 during the inactivity time period, or "m=0" sub-frames include data in the most recent "M" sub-frames). In some embodiments, the wireless communication device 102 monitors uplink activity during the inactivity time period, e.g., no or minimal uplink data activity during the M sub-frames also must occur, after which the wireless communication device 102 can be reconfigured to disable receive diversity. When receive diversity is disabled, wireless circuitry including all or part of a receive signal chain can be powered down to conserve power at the wireless communication device 102. A second receive signal chain can remain active and powered up, so that signaling messages and data activity can be detected and received. Diagram 800 illustrates re-configuring the wireless communication device 102 to enable receive diversity, e.g. activating multiple (two) receive signal chains in parallel, in response to data activity being detected. In particular, when a single data packet (or a single downlink radio resource assignment, or a single sub-frame, i.e., "n=1" out of "N=1" sub-frames, includes downlink data) is detected, receive diversity is enabled. Diagram 810 illustrates the wireless communication device 102 configured for a c-DRX mode with a c-DRX inactivity timer having a value that corresponds to a time period greater than M sub-frames. After M sub-frames of data inactivity, the wireless communication device 102 transitions from a receive diversity enabled mode to a receive diversity disabled mode. When the c-DRX inactivity timer expires, the wireless communication device 102 enters a sleep state of a c-DRX cycle followed by brief "awake" time periods to listen for signaling messages and/or data activity. During the "awake" time periods of the c-DRX cycle, the wireless communication device 102 can use a single receive signal chain rather than dual (or generally multiple) receive signal chains, which can conserve power at the wireless communication device 102. In response to reception of a single sub-frame with data (or a single data packet, or a single sub-frame that includes a downlink radio resource assignment to the wireless communication device 102), the wireless communication device 102 can transition from a receive diversity disabled mode to a receive diversity enable mode, in which two (or multiple) receive signal chains are power up to monitor for and receive signaling and data messages.

FIG. 8 illustrates enabling and disabling receive diversity of the wireless communication device 102 based on a data inactivity time period of M sub-frames with zero data activity therein to disable receive diversity and a data activity time period of N=1 sub-frame with non-zero data activity therein to enable receive diversity. This configuration of m=0, n=1, N=1, provides for rapid response to data activity enabling receive diversity and a delay time period of data inactivity to disable receive diversity. Additional configurations can be considered based on different values or ratios of values for the parameters m, M, n, and N, to balance performance, responsiveness, and power consumption. In an embodiment, values for the parameters can be chosen to improve power consumption savings while maintaining adequate performance. For example, one can choose the data inactivity values (m, M), which determine the transition from receive diversity enabled to receive diversity disabled, for a relatively short time period, i.e., the value for M can correspond to a low number of sub-frames, and the value for m can be greater than zero, so that minimal or no data inactivity within the M sub-frames can trigger disablement of receive diversity. In some embodiments, the values for m and M can be selected together based on a percentage of sub-frames within the time window measured indicating a level of data inactivity that warrants disabling receive diversity.

In an embodiment, the ratio m/M can be set to 10%, the value for m=1, and the value for M=10. Thus, over a recent time window of 10 sub-frames, when the level of data inactivity equals or falls below 10% (e.g., zero or one sub-frame of data activity or radio resource assignment in 10 consecutive most recent sub-frames), receive diversity can be disabled. In an embodiment, the ratio n/N can be set to 20%, the value for n=1, and the value for N=5. When the level of data activity equals or exceeds 20% (e.g., at least one sub-frame of data activity or radio resource assignment in 5 consecutive most recent sub-frames), receive diversity can be enabled. Different values for m, M, n, and N can be selected to achieve the percentages indicated (i.e., equal or less than m/M=20% data activity to disable receive diversity and equal or greater than n/N=10% data activity to enable receive diversity), with higher values for M and/or N extending the time period of data inactivity over which a decision is made, which can delay transitions between receive diversity states. The values for the parameters described above can correspond to improved power consumption savings with adequate performance.

In an embodiment, the ratio m/M can be set to 0%, the value for m=0, and the value for M=integer corresponding to a maximum round trip delay time period for communication of TCP traffic with the wireless network. Receive diversity can be disabled only following a time period of M sub-frames with no data activity during that time period. In this case, with these parameter values, the wireless communication device 102 can guarantee that the last data packet of a sessions is received before disabling a receive signal chain. In an embodiment, the ratio n/N can be set to 100%, the value for n=1, and the value for N=1. With these parameter values, a single data packet (or resource allocation in a most recent sub-frame) can cause receive diversity to be enabled. The values for the parameters described above can correspond to higher performance with moderate power consumption savings. In an embodiment, values for M can be selected so that a certain percentage of inter-arrival time between data packets within a data activity time period (i.e., a burst of data packets) is guaranteed to fall below a time period corresponding to M sub-frames.

The foregoing embodiments describe determining whether to enable or disable receive diversity based on an amount of data activity (or data inactivity) during a most recent time period (e.g., a sliding window measure). These embodiments can provide prompt responsiveness to changes in data activity levels with a minimal amount of information being processed to determine a configuration change for the wireless communication device 102. Additional embodiments can use a "block" average in which a radio resource scheduling ratio, (e.g., a data activity/inactivity metric), is evaluated after receiving a block of PDCCH indications. A decision to enable or disable receive diversity can occur at discrete time intervals when an entire block of PDCCH indications is complete. In other embodiments, data activity measures (e.g., number of data packets transmitted or received, number of sub-frames with radio resource assignments to the wireless communication device 102) can be filtered through finite impulse response (FIR) or infinite impulse response (IIR) filters, with the filtered values used to determine whether a threshold has been equaled, exceeded, or fallen below.

In addition to a level of data activity/inactivity, as described herein, the wireless communication device 102 can also consider downlink radio frequency signal conditions when determining whether to enable and/or disable receive diversity. The wireless communication device 102 can disable receive diversity based on a level of data inactivity (downlink and/or uplink) and based on a determination that downlink radio frequency channel conditions at the wireless communication device 102 permit reliable decoding of one or more signaling channels, e.g., the PDCCH and/or PHICH, using a single receive signal chain. When reliable decoding of the one or more signaling channels is not guaranteed using only one receive signal chain, the wireless communication device 102 can continue to enable receive diversity in order to improve performance of receiving and decoding successfully signaling messages on the one or more signaling channels. Several different physical layer metrics can be used to evaluate downlink radio frequency signal conditions at the wireless communication device 102 including a receive signal to interference noise ratio (Rx SINR), a reference signal received power (RSRP), a reference signal received quality (RSRQ), a channel quality indicator (CQI), and a rank indicator (RI). In some embodiments, a signal power level or rate for the PDCCH can be controlled by the eNodeB 210 of the LTE wireless network 200, e.g., based on channel quality feedback information provided by the wireless communication device 102 in one or more channel status reports. The wireless communication device 102 can optionally use one or more of the following factors to determine threshold values for one or more of the different physical layer metrics listed above. An instantaneous or filtered metric value can be compared against a threshold value to determine whether the receive signal conditions permit use of a single receive signal chain for receiving and decoding successfully a signaling channel, e.g., the PDCCH and/or PHICH. In an embodiment, a receive signal strength (power) level for the PDCCH can be compared with a reference signal strength (power) level for the physical downlink shared channel (PDSCH) to determine whether the PDCCH can be reliably decoded using a single receive signal chain. In an embodiment, a signal quality for the PDCCH can be compared to a signal quality for a reference signal (RS) on the PDSCH. In an embodiment, channel quality indicator (CQI) values for when receive diversity is enabled and disabled can be compared to determine whether reliable decoding of the PDCCH (or PHICH) can be achieved when the wireless communication device 102 is configured to use a single receive signal chain (i.e., receive diversity disabled).

In some embodiments, when the wireless communication device is configured for the c-DRX mode, values for the data inactivity time period (M sub-frames) during which to measure data activity to determine whether to disable receive diversity can be set to be equal or less than a time period for the c-DRX inactivity timer. The wireless communication device 102 can relay on a setting from the LTE wireless network 200 to determine a "worst-case" scenario to detect data inactivity, e.g., data packets within a packet session burst can be assumed to have inter-arrival times shorter than a time period set by the c-DRX inactivity timer. Thus, the wireless communication device 102 can avoid disabling receive diversity in the midst of a data packet burst with variable inter-arrival times. In some embodiments, when the wireless communication device is configured for the c-DRX mode, values for the time period (N sub-frames) over which to measure data activity to determine whether to enable receive diversity can be set to be less than a time period based on the c-DRX inactivity timer. In particular, measuring data activity over a time period equal or longer than a time period used to measure data inactivity to enter a sleep mode for a c-DRX cycle can be inconsistent with settings by the LTE wireless network 200. In an embodiment a value of the c-DRX inactivity timer equals an integer number of sub-frames, and the value for N is selected to be an integer at least one less the value of the c-DRX inactivity timer.

Figure 9:
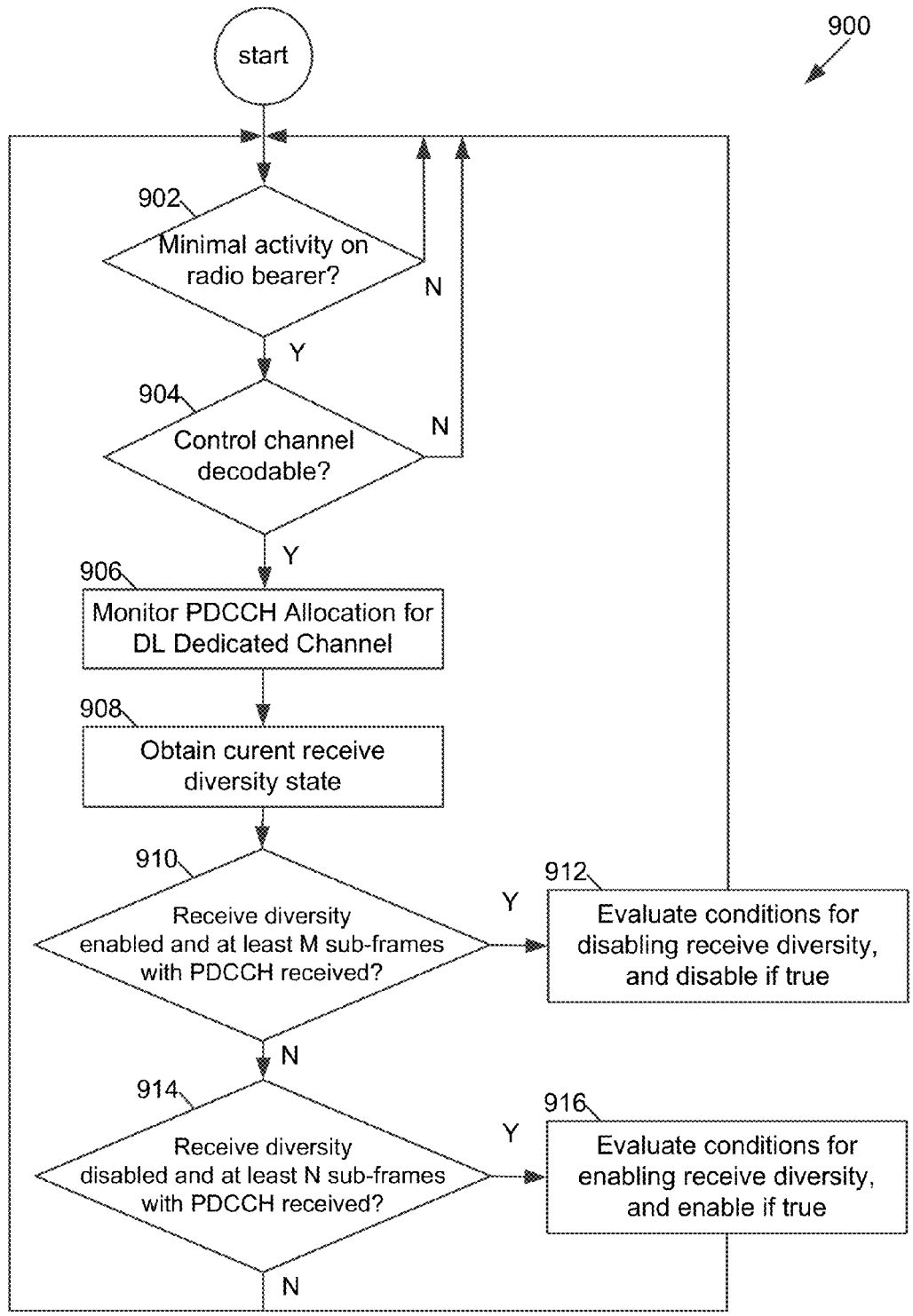
FIG. 9 illustrates a representative method for managing configuration modes of a wireless communication device during a communication session with a wireless network in accordance with some embodiments.

FIG. 9 illustrates a representative method 900 for managing configuration modes of the wireless communication device 102 during a communication session with a wireless network, e.g., with the LTE wireless network 200. The method 900 shown in FIG. 9 provides a process for configuring the wireless communication device 102 to use one or more receive signal chains based on measuring data activity (inactivity) levels and/or radio resource scheduling frequency. In some embodiments, the method 900 illustrated in FIG. 9 can be implemented as a set of computer program code stored on a non-transitory computer-readable medium and executed by one or more processors of the wireless communication device 102. In step 902, the wireless communication device 102 determines whether a minimal amount of data activity is detected, e.g., low data activity or no data activity on one or more data carrying and/or signaling radio bearers during a most recent sliding window time period. When low or no data activity is detected, the wireless communication device 102 proceeds to step 904, otherwise, the monitoring of data activity in step 902 continues. In step 904, the wireless communication device 102 determines whether one or more signaling control channels, e.g., the PDCCH and/or the PHICH, can be reliably received and decoded successfully. In an embodiment, the wireless communication device 102 measures one or more radio frequency receive signal conditions to determine a signal strength and/or a signal quality level to evaluate whether the signaling control channel can be reliably decoded. In some embodiments, the wireless communication device 102 attempts to decode the one or more signaling control channels, and when error detection and correction mechanisms indicate that the message is received correctly, the wireless communication device 102 can proceed to use the decoded information, and when the message is not received correctly, the wireless communication device 102 can ignore the information. In step 906, the wireless communication device 102 can monitor a signaling control channel, e.g., the PDCCH, to determine radio resource allocations for the wireless communication device 102, which can indicate downlink data activity. In an embodiment, the wireless communication device 102 monitors the PDCCH in each sub-frame received to determine whether a radio resource allocation for the wireless communication device 102 occurs, e.g., by searching for a particular cell radio network temporary identifier (C-RNTI) on a downlink (DL) dedicated channel. In step 608, the wireless communication device 102 obtains a current receive diversity state of the wireless circuitry of the wireless communication device 102. When receive diversity is enabled, and when at least M sub-frames that include a PDCCH have been received (during which monitoring of data activity has occurred), as determined in step 910, the wireless communication device 102 proceeds to step 912. In step 912, the wireless communication device 102 evaluates a first set of conditions to determine whether to disable receive diversity, and when the first set of conditions holds true, receive diversity for the wireless communication device is disabled. Otherwise, the process continues again with monitoring at step 902. When receive diversity is not enabled at the wireless communication device 102, or when less then M sub-frames with the PDCCH have been received, the wireless communication device 102 proceeds from step 910 to step 914. In step 914, when receive diversity is disabled, and when at least N sub-frames that include a PDCCH have been received (during which monitoring of data activity has occurred), the wireless communication device 102 proceeds to step 916. In step 916, the wireless communication device 102 evaluates a second set of conditions to determine whether to enable receive diversity, and when the second set of conditions holds true, the wireless communication device 102 enables receive diversity. In an embodiment, the method 900 starts after an initialization and/or reset procedure in which monitoring for data activity is initialized. In some embodiments, the wireless communication device 102 is initialized to have receive diversity disabled. In some embodiments, the wireless communication device 102 is initialized to have receive diversity enabled. In some embodiments, monitoring for downlink data activity is reset when a change in receive diversity state occurs, e.g., from receive diversity enabled to receive diversity disabled, or from receive diversity disabled to receive diversity enabled. The first and second sets of conditions to evaluate whether to enable and/or disable receive diversity are described further herein.

In one or more embodiments, the first set of conditions to determine whether to disable receive diversity include (1) a current receive diversity state of the wireless communication device 102, (2) a level of downlink data activity, (3) a downlink receive signal strength or quality level, and (4) an uplink data activity state. In an embodiment, a first condition in the first set of conditions is that the current receive diversity state of the wireless communication device 102 is "receive diversity enabled." When receive diversity is already disabled, no additional conditions need be tested to determine whether to disable receive diversity. In an embodiment, a second condition in the first set of conditions is that the level of downlink data activity is at or below a first threshold level, e.g., when "m" or fewer sub-frames in a time period of "M" most recent sub-frames include downlink data and/or a radio resource grant on the PDCCH indicating downlink data, or when m/M or less percent of sub-frames during a monitoring time period include downlink data activity and/or radio resource grants for downlink data to the wireless communication device 102. In an embodiment, only sub-frames that include a PDCCH are considered when determining data activity. In an embodiment, a third condition in the first set of conditions is that the downlink radio frequency conditions indicate reliable reception of one or more particular signaling control channels. The third condition can include determining that the downlink RF conditions indicate that the PDCCH can be received reliably using a single receive signal chain. In an embodiment, a fourth condition in the first set of conditions determines an uplink data activity state of the wireless communication device 102. The fourth condition can include determining that no pending uplink radio resource grants exist for the wireless communication device 102. With no pending uplink data traffic anticipated (as there are no pending grants), the wireless communication device 102 can determine whether receive diversity can be disabled using the first, second, and third conditions. When there are pending uplink radio resource grants for the wireless communication device 102, disabling receive diversity can affect an ability of the wireless communication device 102 to receive control signaling messages from the eNodeB 210 on a control signaling channel, e.g., the PHICH, in response to uplink data traffic. Thus, the fourth condition can include further determining when uplink radio resources grants exist, whether the downlink radio frequency channel conditions indicate that the PHICH can be decoded reliably using only one receive signal chain. If all four conditions are true, then the wireless communication device 102 can configure itself to a receive diversity disabled state, a secondary receive signal chain can be powered down (in part or wholly) to conserve power, and a monitoring state of the PDCCH can be reset. In an embodiment, a data activity monitoring state is reset following each change in a receive diversity configuration of the wireless communication device, e.g., from enabled to disabled or vice versa.

To reiterate, in some embodiments, a first set of conditions to disable receive diversity at the wireless communication device 102 can include the following.

If:
    Receive diversity is Enabled AND
    m or fewer out of last M monitored PDCCH have a Downlink allocation, AND
    DL RF channel conditions are such that PDCCH can be received reliably using one receive chain AND
If:
    There are Uplink Grants allocated AND
    DL RF channel conditions are such that PHICH can be decoded reliably using one receive chain
Else
    There are no Uplink Grants
Then:
    Disable Rx Diversity.
    Disable secondary receive chain.
    RESET PDCCH monitoring state.

In some embodiments, a portion of the fourth condition for testing a level of uplink data activity (e.g., Uplink Grants) can be optional. For example, when there is a relatively low level of uplink data activity, testing for uplink grants in the fourth condition can be eliminated or optionally applied. In some embodiments, certain applications can generate traffic patterns in which uplink traffic can be related to downlink traffic, and thus testing conditions of downlink traffic can suffice. For example, with bi-directional packet traffic including downlink TCP packets and uplink acknowledgements, the uplink and downlink traffic can be linked. Thus, checking for uplink data activity can be redundant to already checking for downlink data activity.

In one or more embodiments, the second set of conditions to determine whether to enable receive diversity include (1) a current receive diversity state of the wireless communication device 102, (2) a level of downlink data activity, (3) a downlink receive signal strength or quality level, and (4) an uplink data activity state. As with disabling receive diversity, similar conditions are tested, although the test conditions can differ. In an embodiment, a first condition in the second set of conditions is that the current receive diversity state of the wireless communication device 102 is "receive diversity disabled." When receive diversity is already enabled, no additional conditions need be tested to determine whether to enable receive diversity. In an embodiment, a second condition in the second set of conditions is that the level of downlink data activity is at or above a second threshold level, e.g., when "n" or more sub-frames in a time period of "N" most recent sub-frames include downlink data and/or a radio resource grant on the PDCCH indicating downlink data, or when n/N or higher percent of sub-frames during a monitoring time period include downlink data activity and/or radio resource grants for downlink data to the wireless communication device 102. In an embodiment, only sub-frames that include a PDCCH are considered when determining data activity. In an embodiment, a third condition in the second set of conditions can include determining that the downlink radio frequency conditions indicate that reliable reception of the PDCCH cannot be achieved using a single receive signal chain at the wireless communication device 102. When the PDCCH cannot be reliably decoded, receive diversity can be enabled to improve downlink performance for decoding the PDCCH signaling control channel. In an embodiment, a fourth condition in the second set of conditions can include determining that pending uplink radio resource grants exists for the wireless communication device 102, i.e., the wireless communication device 102 has pending allocated uplink radio resource grants, which can indicate pending uplink data traffic, which when transmitted can in turn indicate downlink HARQ/ACK/NACK control signaling messages from the eNodeB 210 to the wireless communication device 102, e.g., using the PHICH, can be expected. When there are allocated uplink radio resource grants, the fourth condition in the second set of conditions can further include determining that downlink radio frequency conditions indicate that reliable reception of the PHICH cannot be achieved using a single receive signal chain at the wireless communication device 102. When the PHICH cannot be reliably decoded, and with allocated uplink radio resource grants, the wireless communication device 102 can enable receive diversity (if it's not already enabled) to improve downlink performance for decoding the PHICH signaling control channel. In an embodiment, when the first condition is true (receive diversity disabled) and either the second condition is true (a high enough level of downlink data activity or "poor" downlink RF channel conditions for decoding the PDCCH) or the third conditions is true (allocated uplink radio resource grants and "poor" downlink RF channel conditions for decoding the PHICH), the wireless communication device 102 in response can configure itself to a "receive diversity enabled" state or mode of operation, can enable multiple receive signal chains (e.g., at least a primary receive signal chain and a secondary receive signal chain), and can monitoring state of the PDCCH can be reset.

To reiterate, in some embodiments, a second set of conditions to enable receive diversity at the wireless communication device 102 can include the following.

If:
    Receive diversity is disabled AND
    n or more out of last N monitored PDCCH have Downlink allocation OR
    DL RF channel conditions are such that PDCCH cannot be received reliably using one receive chain OR
If:
    There are Uplink Grants allocated AND
    DL RF channel conditions are such that PHICH cannot be received reliably using one receiver chain.
Then:
    Enable Rx Diversity.
    Enable both receiver chains.
    RESET PDCCH monitoring state.

As described above for the first set of conditions, the fourth condition of the second set of conditions can include the uplink grant allocation test optionally, in some embodiments.

In some embodiments, the methods described above can be performed irrespective of a rank indicator provided by the eNodeB 210 to the wireless communication device 102, e.g., when operating in rank 1 or in rank 2. In some embodiments, the methods described above can be performed only when operating in rank 1. Changing configurations of the receive signal chains in a wireless communication device 102 can result in additional parameters changing as a result. For example, some algorithms to adjust automatic gain control (AGC) values, channel filter estimates, receive signal chain filter coefficients etc. can require time to converge. In some embodiments, when "outer loops" that control certain operating signal characteristic values are not converging quickly enough, the methods described herein can be performed only when operating in rank 1 (e.g., when no MIMO transmission is used). In some circumstances, convergence times of various parameters at the wireless communication device 102 when operating in rank 1 can be acceptable. As noted hereinabove, CQI values can vary when a single receive signal chain is used or when two receive signal chains are used (for receive diversity). Reported CQI values from the wireless communication device 102 to the eNodeB 210 can influence downlink modulation and coding scheme (MCS) values, rank indicator (RI) values, and precoding matrix indicator (PMI) selection. If the reporting time period for the channel status reports (CQI, RI, PMI values) is long, then application of the converged values can be delayed, and performance can be impacted during the "transition" time period. In a representative example, rank indicator (RI) values can be reported at a different rate than channel quality indicator (CQI) values. For example, RI reporting can be every 80 milliseconds, while CQI reporting can be every 20 milliseconds. When a transition of receive diversity state at the wireless communication device 102 occurs, there can be a delay in reporting the updated RI values, e.g., from rank 2 to rank 1 when disabling receive diversity (and downlink MIMO is in use) or from rank 1 to rank 2 when enabling receive diversity (and downlink MIMO is preferred). In an embodiment, disabling receive diversity can be restricted to only occurring when rank one is set, and thus rank two transmissions can be received successfully using multiple receivers without a risk in losing performance.

In some embodiments, receive diversity can be disabled when downlink data activity (e.g., as indicated by scheduled radio resource grants) is less than a particular threshold. In some embodiments, receive diversity can be disabled when downlink data activity is less than the particular threshold and rank one transmissions are set (otherwise receive diversity can remain enabled). In some embodiments, when downlink data activity is less than a particular threshold, and rank two transmission is set, the wireless communication device 102 can pre-emptively communicate RI values of one to the eNodeB 210 before disabling receive diversity. Thus the eNodeB 210 can be informed a priori of a change in receive diversity and prepare to change to rank one transmissions. In some embodiments, the wireless communication device 102 can await a rank indication of one from the eNodeB 210 in response to one or more reported RI values of one before switching to disable receive diversity.

Figure 10:
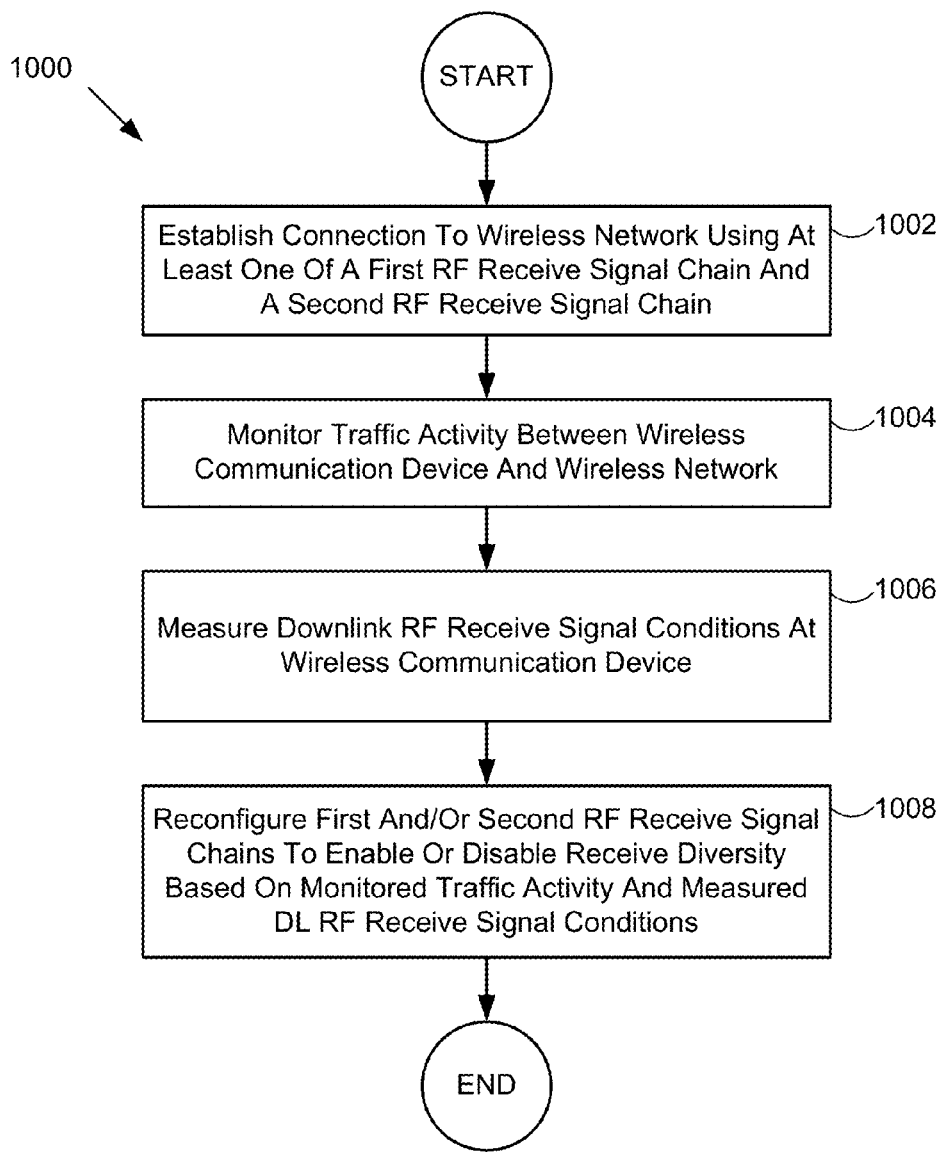
FIG. 10 illustrates a representative method to reconfigure wireless circuitry in a wireless communication device connected to a wireless network in accordance with some embodiments.

FIG. 10 illustrates a representative method 1000 to reconfigure wireless circuitry 310 in a wireless communication device 102 connected to a wireless network 100 in accordance with some embodiments. In some embodiments, the wireless communication device 102 corresponds to a UE 202, and the wireless network 100 corresponds to an LTE wireless network 200. In some embodiments, the wireless circuitry 310 includes a first radio frequency (RF) receive signal chain and a second RF receive signal chain. In step 1002, the wireless communication device 102 establishes a connection with the wireless network 100 using wireless circuitry that includes at least the first RF receive signal chain and the second RF receive signal chain. In an embodiment, the connection uses both the first and second RF receive signal chains to provide receive diversity to the wireless communication device. In step 1004, the wireless communication device 102 monitors traffic activity between the wireless communication device 102 and the wireless network 100. In an embodiment, the traffic activity includes one or more of: downlink data traffic, uplink data traffic, downlink radio resource allocation grants, and uplink radio resource allocation grants. In step 1006, the wireless communication device 102 measures downlink RF receive signal conditions at the wireless communication device 102. In an embodiment, the downlink RF receive signal conditions include one or more of: a signal to interference plus noise ratio (SINR), a reference signal received power (RSRP), a reference signal received quality (RSRQ), a block error rate (BLER) level, and a bit error rate (BER) level. In an embodiment, the wireless communication device measures an RSRP for a physical downlink control channel (PDCCH) and compares the measured RSRP of the PDCCH to a measured RSRP for a reference signal on a physical downlink shared channel (PDSCH). In step 1008, the wireless communication device reconfigures the first RF receive signal chain and the second RF receive signal chain to enable receive diversity or to disable receive diversity based on the monitor traffic activity and the measured downlink RF receive signal conditions at the wireless communication device 102.

In an embodiment, the wireless communication device 102 monitors traffic activity by measuring a level of data traffic communicated between the wireless communication device 102 and the wireless network 100 during a sliding window time period of M sub-frames, when the wireless circuitry is configured with receive diversity enabled. In an embodiment, the wireless communication device disables receive diversity when the measured level of data traffic equals or falls below a data activity threshold, and when the measured downlink RF receive signal conditions allow reliable decoding of at least one downlink signaling control channel, e.g., the PDCCH, using one of the first and second RF receive signal chains. In an embodiment, measuring the level of data traffic includes counting a number of sub-frames in the sliding window time period of M sub-frames that include a downlink radio resource allocation grant for the wireless communication device 102. In an embodiment, the data activity threshold is a non-negative integer number of sub-frames. In an embodiment, monitoring traffic activity includes determining whether any uplink radio resource allocation grants from the wireless network 100 are pending, and when uplink radio resource allocation grants are pending, determining whether the downlink RF receive signal conditions allow reliable decoding of the physical hybrid automatic repeat request indicator channel (PHICH). When reliable decoding of the PHICH is not indicated and uplink radio resource grant allocations are pending, receive diversity can be not disabled. In an embodiment, the wireless communication device 102 sends at least one channel status report to the wireless network 100 including a rank indicator value of one before disabling receive diversity.

In an embodiment, the wireless communication device 102 monitors traffic activity by measuring a level of data traffic communicated between the wireless communication device 102 and the wireless network 100 during a sliding window time period of N sub-frames when the wireless circuitry is configured with receive diversity disabled. In an embodiment, the wireless communication device 102 reconfigures the wireless circuitry to enable receive diversity when the measured level of data traffic equals or exceeds a data activity threshold. In an embodiment, a minimum level of data traffic to enable receive diversity equals a single data packet or a single sub-frame that includes a downlink radio resource allocation grant for the wireless communication device in a sliding window of only one sub-frame. In an embodiment, the wireless communication device 102 enables receive diversity when the measured downlink radio frequency receive signal conditions does not allow reliable decoding of at least one downlink signaling control channel using only one of the first and second radio frequency receive signal chains.

Representative applications of systems, methods, apparatuses, and computer program products according to the present disclosure are described in this section hereinabove. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the examples should not be taken as limiting.

In the detailed description provided, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting, such that other embodiments may be used; and changes may be made without departing from the spirit and scope of the described embodiments.

Software, hardware, or a combination of hardware and software can implement various aspects of the described embodiments. The described embodiments can include devices comprising circuitry, one or more processors, and memory coupled to the one or more processors, where the one or more processors are configured to execute computer-executable instructions stored within the memory to cause the device to perform a set of actions. A representative set of actions includes actions outlined in one or more methods described herein. The described embodiments can also be encoded as computer program code on a non-transitory computer readable medium. The non-transitory computer readable medium is any data storage device that can store data that can thereafter be read by a computer system. Examples of the non-transitory computer readable medium include read-only memory, random-access memory, CD-ROMs, DVDs, magnetic tape and optical data storage devices. The computer program code can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described.

Hence, all suitable modifications and equivalents can be resorted to as falling within the scope of the invention.

What is claimed is:

1. A method to configure wireless circuitry in a wireless communication device, the method comprising:
by the wireless communication device:
establishing a connection to a wireless network using wireless circuitry that includes a first radio frequency receive signal chain and a second radio frequency receive signal chain;
monitoring traffic activity communicated between the wireless communication device and the wireless network over the connection, wherein: i) monitoring traffic activity includes counting a number of sub-frames in a sliding window time period of M sub-frames that include a downlink radio resource allocation grant on at least one downlink signaling control channel for the wireless communication device when the wireless circuitry is configured with receive diversity enabled, ii) the monitoring traffic activity determines whether any uplink radio resource allocation grants from the wireless network are pending;
measuring downlink radio frequency receive signal conditions at the wireless communication device; and
reconfiguring the wireless circuitry to enable receive diversity or to disable receive diversity at the wireless communication device based on:
the monitored traffic activity, and
whether the measured downlink radio frequency receive signal conditions allow reliable decoding of the at least one downlink signaling control channel using only one of the first and second radio frequency receive signal chains.

2. The method of claim 1, wherein
monitoring traffic activity includes measuring a level of data traffic communicated between the wireless communication device and the wireless network during the sliding window time period, and
the wireless communication device reconfigures the wireless circuitry to disable receive diversity when the measured level of data traffic equals or falls below a data activity threshold and the measured downlink radio frequency receive signal conditions allow reliable decoding of the at least one downlink signaling control channel using only one of the first and second radio frequency receive signal chains.

3. The method of claim 2, wherein
the measured level of data traffic is zero during the sliding window time period of M sub-frames.

4. The method of claim 2, wherein
the data activity threshold includes a non-negative integer number of sub-frames.

5. The method of claim 2, wherein
measuring the level of data traffic includes determining a percentage of sub-frames in the sliding window time period of M sub-frames that include a downlink radio resource allocation grant for the wireless communication device, and
the data activity threshold includes a non-negative percentage value.

6. The method of claim 1, wherein
the at least one downlink signaling control channel comprises a physical downlink control channel (PDCCH), and
the wireless network operates in accordance with a long term evolution (LTE) or long term evolution advanced (LTE-A) wireless communication protocol.

7. The method of claim 6, wherein,
when uplink radio resource allocation grants are pending, the at least one downlink signaling control channel further comprises a physical hybrid automatic repeat request indicator channel (PHICH).

8. The method of claim 2, further comprising:
sending at least one channel status report to the wireless network including a rank indicator (RI) value of one before disabling receive diversity.

9. The method of claim 1, wherein
monitoring traffic activity includes measuring a level of data traffic communicated between the wireless communication device and the wireless network during a sliding window time period of N sub-frames when the wireless circuitry is configured with receive diversity disabled, and
the wireless communication device reconfigures the wireless circuitry to enable receive diversity when the measured level of data traffic equals or exceeds a data activity threshold or when the measured downlink radio frequency receive signal conditions does not allow reliable decoding of the at least one downlink signaling control channel using only one of the first and second radio frequency receive signal chains.

10. The method of claim 9, wherein
the measured level of data traffic is one during the sliding window time period of N sub-frames.

11. The method of claim 10, wherein N=1.

12. The method of claim 9, wherein the at least one downlink signaling control channel comprises a physical downlink control channel (PDCCH).

13. The method of claim 9, wherein
when uplink radio resource allocation grants are pending, the at least one downlink signaling control channel comprises a physical hybrid automatic repeat request indicator channel (PHICH).

14. A wireless communication device comprising:
wireless circuitry including a first radio frequency receive signal chain and a second radio frequency receive signal chain;
one or more processors coupled to the wireless circuitry; and
a memory coupled to the one or more processors,
wherein the one or more processors are configured to execute computer-executable instructions stored within the memory to cause the wireless communication device to:
establish a connection to an LTE wireless network using the wireless circuitry;
monitor downlink radio resource grant allocations received from the wireless network over a sliding window time period by: i) at least counting a number of sub-frames in the sliding window time period that include a downlink radio resource allocation grant on at least one downlink signaling control channel for the wireless communication device when the wireless circuitry is configured with receive diversity enabled, and ii) determining whether any uplink radio resource allocation grants from the wireless network are pending;
measure a set of downlink radio frequency receive signal conditions at the wireless communication device; and reconfigure the wireless circuitry to enable receive diversity or to disable receive diversity using the first radio frequency receive signal chain and the second radio frequency receive signal chain based on:
the monitored downlink grant allocations, and
whether the measured set of downlink radio frequency receive signal conditions allow reliable decoding of the at least one downlink signaling control channel using only one of the first and second radio frequency receive signal chains.

15. The wireless communication device of claim 14, wherein the one or more processors are configured to cause the wireless communication device to reconfigure the wireless circuitry to disable receive diversity when no downlink radio resource grant allocations are received from the LTE wireless network over the sliding window time period and the measured set of downlink radio frequency receive signal conditions allow reliable decoding of a physical downlink control channel (PDCCH) using only one of the first and second radio frequency receive signal chains.

16. The wireless communication device of claim 15, wherein the one or more processors are further configured to cause the wireless communication device to transmit at least one channel status report including a rank indicator (RI) value of one to the LTE wireless network before disabling receive diversity.

17. The wireless communication device of claim 14, wherein the one or more processors are configured to cause the wireless communication device to measure the set of downlink radio frequency receive signal conditions by at least measuring one or more of a reference signal received power (RSRP) or a reference signal received quality (RSRQ).

18. The wireless communication device of claim 14, wherein the one or more processors are configured to cause the wireless communication device to reconfigure the wireless circuitry to enable receive diversity when at least one downlink radio resource grant allocation is received from the LTE wireless network over the sliding window time period.

19. The wireless communication device of claim 14, wherein the one or more processors are configured to cause the wireless communication device to reconfigure the wireless circuitry to enable receive diversity when the measured set of downlink radio frequency receive signal conditions does not allow reliable decoding of a physical downlink control channel (PDCCH) using only one of the first and second radio frequency receive signal chains.

20. A computer program product encoded as computer program code in a non-transitory computer readable medium for configuring wireless circuitry of a wireless communication device, the computer program product comprising:
computer program code for establishing a connection between the wireless communication device and an LTE wireless network using wireless circuitry that includes a first radio frequency receive signal chain and a second radio frequency receive signal chain;
computer program code for monitoring traffic activity by:
i) at least counting a number of sub-frames in a sliding window time period that include a downlink radio resource allocation grant on at least one downlink signaling control channel for the wireless communication device when the wireless circuitry is configured with receive diversity enabled, and ii) determining whether any uplink radio resource allocation grants from the wireless network are pending;
computer program code for measuring downlink radio frequency receive signal conditions at the wireless communication device;
computer program code for enabling receive diversity using both the first and second radio frequency receive signal chains when the measured downlink radio frequency receive signal conditions do not allow reliable decoding of at least one signaling channel using only one of the first and second radio frequency receive signal chains; and
computer program code for disabling receive diversity when the monitored traffic activity falls below a threshold and the measured downlink radio frequency receive signal conditions allow reliable decoding of a physical downlink control channel (PDCCH) using only one of the first and second radio frequency receive signal chains.

* * * * *